United States Patent [19]

Huang

[11] Patent Number: 5,455,927
[45] Date of Patent: Oct. 3, 1995

[54] DUAL SOCKET UPGRADEABLE COMPUTER MOTHERBOARD WITH AUTOMATIC DETECTION AND ENABLEMENT OF INSERTED UPGRADE CPU CHIP

[75] Inventor: Hung-Ta Huang, Taipei, Taiwan

[73] Assignee: Acer Incorporated, Taipei, Taiwan

[21] Appl. No.: 998,879

[22] Filed: Dec. 28, 1992

Related U.S. Application Data

[63] Continuation of Ser. No. 748,780, Aug. 22, 1991, abandoned.

[51] Int. Cl.$^6$ ................................................ G06F 15/76
[52] U.S. Cl. ................................................ 395/500
[58] Field of Search ................................ 395/500, 800

[56] References Cited

U.S. PATENT DOCUMENTS

| Re. 31,318 | 7/1983 | Kaufman et al. | 395/400 |
|---|---|---|---|
| 3,721,961 | 3/1973 | Edstrom et al. | |
| 4,075,693 | 2/1978 | Fox et al. | |
| 4,281,392 | 7/1981 | Grants et al. | 395/425 |
| 4,443,846 | 4/1984 | Adcock . | |
| 4,484,273 | 11/1984 | Stiffler et al. | |
| 4,591,975 | 5/1986 | Wade et al. | 395/725 |
| 4,703,419 | 10/1987 | Krause et al. | 395/725 |
| 4,716,526 | 12/1987 | Mori et al. | 395/800 |
| 4,860,252 | 8/1989 | Sykora | 395/400 |
| 4,862,355 | 8/1989 | Newman et al. | |
| 4,899,306 | 2/1990 | Greer | 395/500 |
| 4,908,789 | 3/1990 | Blokkum et al. | 395/425 |
| 4,947,478 | 8/1990 | Maeno | 395/325 |
| 4,951,248 | 8/1990 | Lynch | 395/425 |
| 4,953,930 | 9/1990 | Ramsey et al. | 350/357 |
| 4,964,074 | 10/1990 | Suzuki et al. | |
| 5,077,686 | 12/1991 | Rubinstein | 395/550 |
| 5,101,342 | 3/1992 | Namimoto . | |
| 5,109,506 | 4/1992 | Begun | 395/575 |
| 5,297,272 | 3/1994 | Lu et al. | |

FOREIGN PATENT DOCUMENTS

| 0333318 | 9/1989 | European Pat. Off. . |
|---|---|---|
| 0381448 | 8/1990 | European Pat. Off. . |
| 0411806 | 2/1991 | European Pat. Off. . |
| 61-84764 | 4/1986 | Japan . |
| 61-84765 | 4/1986 | Japan . |
| 61-84767 | 4/1986 | Japan . |

OTHER PUBLICATIONS

IBM Technical Disclosure Bullitin, IBM Corp., Sep. 1989, vol. 32, No. 4A, pp. 467.

"Motherboard Convertibility," *BYTE*, Jun. 1991, p. 68.

Judy Wong, Modular CPU Upgrade Comparison of Acer, ALR and AST, Jun. 13, 1991, pp. 1–2.

*Electronic Engineering Times*, "Intel Rolls Out Road Map: At PC EXPO: Upgrade Plans and 586 Hints," Jul. 9, 1991.

Spiegelman, Lisa L., "12 New Microprocessors to be Unleashed by Intel: Move Could Speed User Upgrades," *Computer Reseller News*, Jul. 1, 1991.

Primary Examiner—Parshotam S. Lall
Assistant Examiner—Richard L. Ellis
Attorney, Agent, or Firm—David N. Slone; Townsend and Townsend and Crew

[57] ABSTRACT

An upgradeable/downgradeable data processing system capable of operating with different types of central processing units (CPU). The system has a first socket for registration of a first CPU and a second socket for registration of a second CPU. Means are provided for preventing possible signal contention between the first and second CPU, and for synchronizing clocks for operating a CPU with the system clock. Means are also provided for interfacing with a coprocessor associated with the different types of CPU as well as for adjusting the signals to and from the CPU to the signal width of the system.

26 Claims, 15 Drawing Sheets

MAPS

DUAL SOCKET UPGRADEABLE COMPUTER MOTHERBOARD WITH AUTOMATIC DETECTION AND ENABLEMENT OF INSERTED UPGRADE CPU CHIP

This is a file wrapper continuation application of U.S. patent application Ser. No. 07/748,780, filed Aug. 22, 1991 now abandoned.

TECHNICAL FIELD

This invention relates in general to a data processing system capable of operating with different types of central processing units (CPU).

BACKGROUND OF THE INVENTION

New microprocessors are introduced at such faster and faster pace that it seems a new model of microprocessor is introduced once every two years or even sooner. As capability and/or speed of newly introduced microprocessors frequently surpass older products and as they tend to be more adapted to needs of the market, they are usually more expensive. But when still newer products are introduced, the prices of these once-new products usually drop drastically.

On the other hand, new application software are introduced almost daily which offer more user-friendly and more powerful functions. But these new software typically demand more and more processing power. As a result, users frequently find their computers not powerful enough to run new software one or two years after the purchase thereof. Those given the responsibilities of procuring data processing equipment, and users in general, therefore, face a problem; what computer to purchase and when is the most appropriate time to purchase a new computer.

Basic components of a typical data processing system include a central processing unit (CPU), memories, control circuits (e.g. clock generators) and interface circuits (e.g. bus interface). In most personal computers, the CPU resides in a main processor chip, e.g. the Intel 80×86. Because it performs logic and arithmetic functions of the system, the CPU chip is the heart of the system and is a major deciding factor determining a system's capability and performance. If the CPU can be changed, the performance of a system can be improved. It is thus desirable to have a computer that can be upgradeable when new and more powerful microprocessors are introduced.

To make upgrading more economical, the motherboard of some prior art computer systems are modulized so that the CPU and other relevant circuits (e.g. controller circuits) are put onto a special board. The special board can be swapped when a new CPU is introduced. In comparison with buying a whole new computer, upgrading a computer with modulized boards is of course more economical. However, as the associated circuits in the special board still constitute a high percentage of its cost, a substantial waste will still be incurred in upgrading a modulized CPU board.

Modulized CPU boards also take up space, a undesirable result in view of the current demand for smaller and more compact computers.

Currently, the more popular microprocessors used by the industry are the Intel microprocessors model numbers 8086, 80286, 80386 80486 and 80487SX (80487SX, also known as P23N, is a microprocessor having an internal coprocessor). These Intel computers are sometimes referred to as 80×86 where x represents a different generation of microprocessors.

Some generations have submodels. For example, the '386 series of microprocessors includes 80386SX (also known as P9) and 80386DX and the '486 series of microprocessors includes 80486DX. Moreover, generation of these computers are also classified in accordance with their respective operation clock frequencies. For example, 80386 has submodels that run on 16 MHz, 20 MHz, 25 MHz and 30 MHz and 80486 has submodels that run on 20 MHz, 25 MHz, 33 MHz and 50 MHz. However, the differences between different generations of microprocessors are usually greater than the differences between submodels.

For a motherboard to be able to operate with different types of CPU, the different characteristics of the different types of CPU must be considered. Also needed to be considered are the specifications of an interface controller (such as the Acer M1209 interface controller) which controls the interface between the CPU and system devices.

In addition, for a motherboard to be able to operate with different types of CPU (e.g. 80486 or 80386), the following technical problems must be considered:

(a) Clock Synchronization

For example, the meaning of "20 MHz" in a model 80386/20 MHz CPU is different from the meaning of "20 MHz" in a model 80486/20 MHz CPU. In a model 80386 CPU, a 40 MHz clock is applied to the CPU chip, and "20 MHz" actually means the frequency of the clock controlling internal operations. For a model 80486 CPU, "20 MHz" means the clock frequency of the external clock applied to the chip. In other words, the frequency of the external clock to the model 80386/20 MHz CPU is actually double that of the model 80486/20 MHz CPU.

Persons skilled in the art know that system clock is commonly divided into different phases and that a certain system activities, such as reading and storing of information, must occur at certain clock phases. For example, in a model 80386 CPU, the cycles of the system clock are divided alternately into a phase 1 and a phase 2. Some system activities, such as the initiation of a CPU cycle (at which time the Address Status signal ADS# is activated) must occur at phase 1, and other system activities, such as reading the CPU Ready signal (CPURDY#) (which signals the end of a CPU cycle) must be performed when phase 2 is changed to phase 1. For 80486 and 80386 to be able to operate in the same motherboard, clock phase problems must be solved.

(b) Signal contention at the system bus

Most CPUs go through initialization before they can begin normal operation. The initialization typically begins when an external signal (for example the CPURST in the 80×86 chips) is applied. The external signal causes the CPU to enter into RESET whereby the CPU pins are set to certain levels (i.e. high "1", low "0", floating "F" or undefined).

An external HOLD signal can be applied to cause certain pins of the 80386 to float and electrically isolate from the bus. But some microprocessors such as the 80386 will ignore the HOLD signal at RESET. For other microprocessors such as the 80486, floating pins can be achieved either by applying the HOLD signal or by setting the BOFF# signal to "0" (80386 does not have the BOFF# pin).

For a motherboard to be able to operate when two different types of microprocessors, such as a 80486 and a 80386, are present (so that the system can operate with either one of the two microprocessors), signal contention at the bus must be prevented. Prevention of signal contention can be prevented by performing a power-up sequence to control the CPUs when entering into operation, taking into consideration their respective special characteristics.

(c) Coprocessor interface

Some microprocessor such as the 80386 have a coprocessor (i.e. 80387) which resides in a separate chip. The main processor 80386 must issue a coprocessor cycle in order to communicate with its coprocessor. In other microprocessors such as models 80487SX and 80486DX CPU, the coprocessor is internal to the main processor chip and the main processor of these models of CPU can communicate directly with its internal coprocessor.

In many microprocessor designs, the coprocessor must interface with an interface controller (which provides interface between the CPU and other system components). Different coprocessors interface differently with the interface controller. As a result, the interface signals between a CPU and the interface controller are different (for example, interface signals in the 80486 are Floating Point Error ("FERR#") and Ignore Numeric Error ("IGNNE#"), whereas interface signals in the 80386 are N9BUSY#, N9ERROR# and N9PEREQ ["N9" represents 80387 and "PEREQ" represents COPROCESSOR REQUEST]). Therefore, for an interface controller to be able to work with coprocessors of different microprocessor models, coprocessor interfacing must be provided with the capability to detect and process coprocessor errors of different types of coprocessors.

(d) Different bus sizes and different bus signals

Data addressing by different types of microprocessors is different. For example, 386SX uses a high portion address (A2–A23) to access units of 16 bits of data (a "word") and a low portion address (A0, A1, BHE#) to access either the whole word, the high byte (8 bits) of the word or the low byte (8 bits) of the word; however, 80486 uses the high portion address (A2–A31) to access units of 32 bits of data and the low portion address (BE3#, BE2#, BE1#, BE0#) to determine whether the data to be accessed is the whole 32 bits, or a 24-bit, 16-bit or 8-bit portion thereof.

Moreover, some microprocessor such as the 80486 have an internal cache memory. In such types of microprocessor, a cacheable memory read cycle (also called a cache line full cycle) is used to access 128-bit data from external memory.

Therefore, for a motherboard to be able to use different types of CPU such as either a 80486 or a 80386, bus interfacing must be provided to change and process signals from the different types of CPU.

Accordingly, an object of the invention is to provide a clock synchronization means to handle clock synchronization problems associated with using different types of CPU.

Another object of the invention is to provide a power-up sequencer which prevents signal contention caused by different types of CPU.

Another object of the invention is to provide a coprocessor interface so that coprocessors of different types of CPU can operate with an interface controller which controls other system components.

Another object of the invention is to provide a bus interface which can change and process signals between the system bus and different types of CPU.

Other objects and technical characteristics of the inventions will be understood with reference to the description of the preferred embodiment and the drawings.

SUMMARY OF THE INVENTION

This invention provides a data processing system capable of operating with different types of central processing units (CPU). The system according to the present invention comprises a clock synchronization means for synchronizing clocks of different microprocessor models to the system clock, a power-up sequencer for controlling a CPU in entering normal operation, a coprocessor interface for detecting a coprocessor and for handling errors in coprocessors of different types of CPU, and a bus interface for providing an interface between different types of CPU and the system bus.

DESCRIPTION OF THE PREFERRED EMBODIMENT

The present invention is described by way of example using 80486 and 80386.

System Architecture

Figure 1:
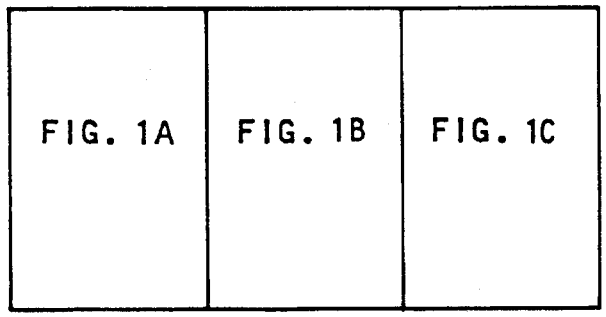
FIG. 1 is a map showing the arrangement of FIGS. 1a, 1b, and 1c to form a complete figure.

FIG. 1 shows a computer system motherboard comprising a clock synchronizer 1, a power-up sequencer 2, a bus interface 15, an interface controller 6, a first CPU socket 9 for plugging in with a first CPU, a coprocessor socket 8 for plugging in with a coprocessor, a second CPU socket 7 for plugging in with a second CPU, a power supply 10, an oscillator 11 and a system bus 12.

The second CPU socket 7 according to this preferred embodiment is for receiving a CPU chip from the 80486 family, such as 80487SX, 80486SX and 80486 ('486). The first CPU socket 9 according to this preferred embodiment is for receiving a CPU from the 80386 family, such as the 80386SX, 80386DX and 80386 ('386). The coprocessor socket 8 is for receiving a coprocessor chip such as the 80387DX or 80387SX.

Interface controller 6 according to the preferred embodiment is an ASIC chip such as the Acer M1209 which provides interfacing between the CPU and the system.

System start

Referring to FIG. 1, when power supply 10 is turned on and power is supplied to the various parts of the system, oscillator 11 will generate a clock CLK2 that has a certain frequency F2. CLK2 is supplied to the clock synchronizer 1, the power up sequencer 2, the coprocessor socket 8, the first CPU socket 9 and the system bus 12. Through the system bus 12, CLK2 is also supplied to the interface controller 6.

The clock synchronizer 1 receives CLK2 and produces another clock CLK1 at frequency F1. This CLK1 from the clock synchronizer 1 is supplied to the power-up sequencer 2, the second CPU socket 7 and the decoder 5 of the bus interface 15. Depending on the requirement of the CPU and other system components such as the interface controller 6, F1 may be faster, slower or same as F2. In this preferred embodiment F2 is equal to two times F1.

Power supply 10 has means for detecting stability of power in the system. When power supply 10 is turned on and the voltage level of the power supply becomes stable (e.g. when fluctuations in the power level are less than ±x% of the voltage value), a power good signal ("POWERGOOD") will be sent to the related units (e.g. the power-up sequencer 2, the interface controller 6). An inactive POWERGOOD (POWERGOOD="0") means that the power supply has not yet been stable.

Interface controller 6 outputs a CPU reset signal (CPURST="1") which is high when power is turned on and before it senses the POWERGOOD="1" signal. Upon sensing POWERGOOD="1", interface controller 6 will drop the CPURST signal to CPURST="0" after it has performed an internal initialization.

Clock synchronization

'386 CPUs divide the cycles of CLK2 into two phases alternate to each other. The cycle that starts after the dropping of the RESET signal (a high-to-low transition of the RESET signal (CPURST)) and every other cycle that follows are identified as phase 2.

Clock synchronization is performed to cause CLK1 to be in-phase with CLK2. "In-phase" means that the rising edge of the CLK1 will occur substantially simultaneously with the rising edge of phase 2 of CLK2. The major reason for synchronization is to allow those units (i.e. the power-up sequencer 2, the second CPU socket 7 and the decoder 5) that receive CLK1 to operate in synchronization with the interface controller 6.

Figure 2:
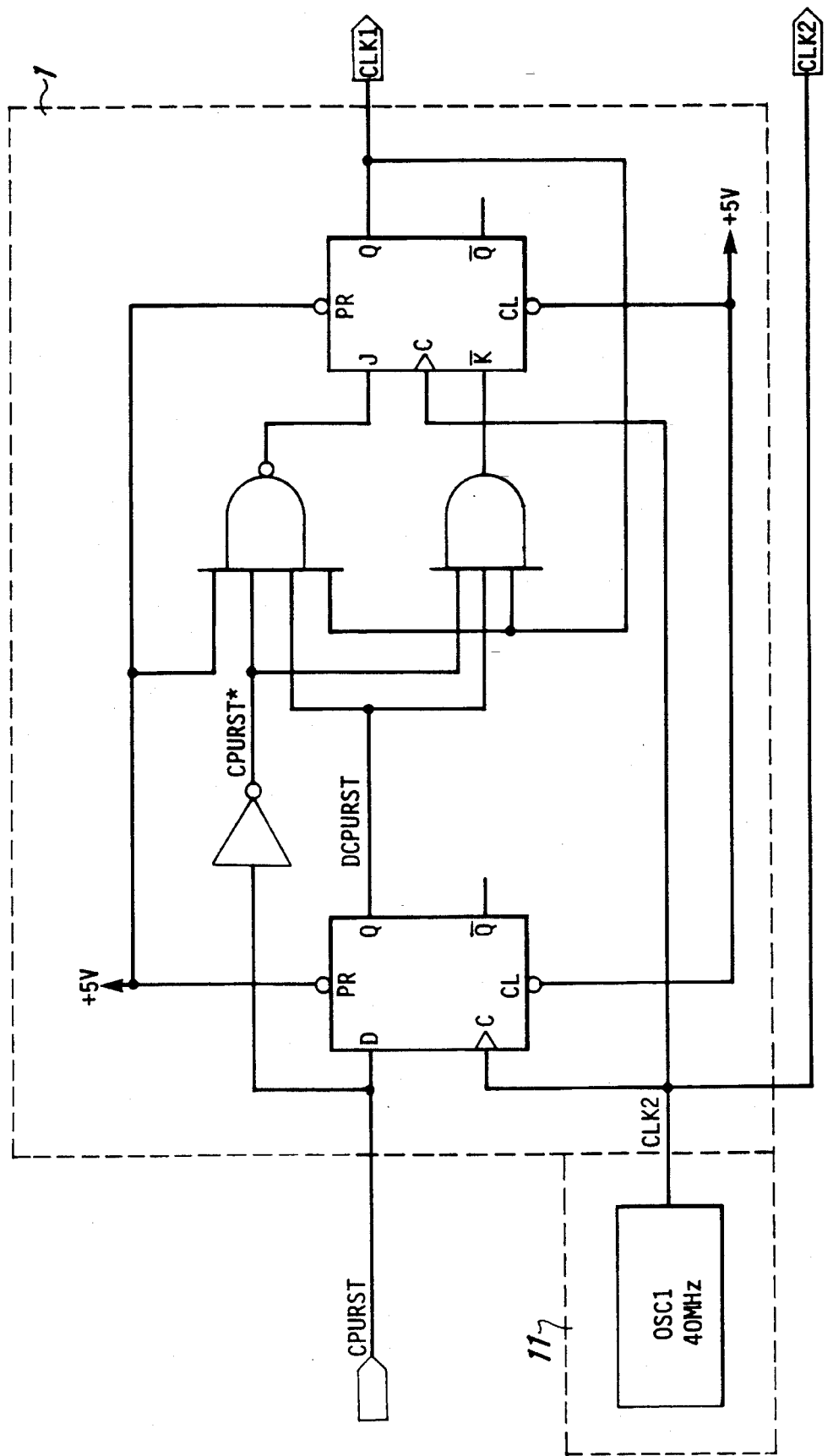
FIG. 2 is a diagram of the clock synchronizer of the system shown in FIG. 1.
Figure 6A:
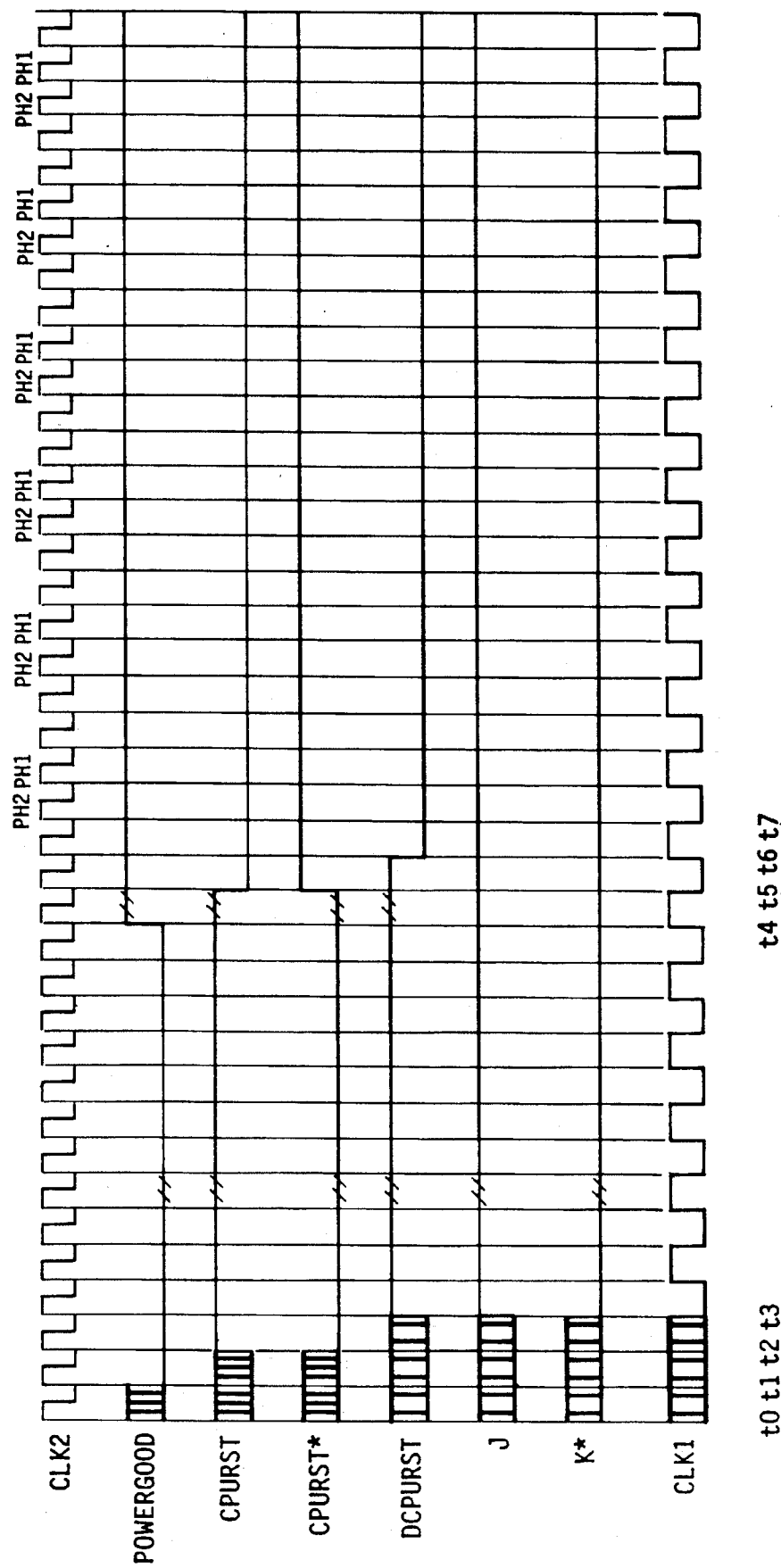
FIG. 6a and 6b are diagrams of the timing sequence generated by the clock synchronizer of FIG. 2.

The principle of operation of the clock synchronizer 1 is now described with reference to FIG. 2 and the timing diagrams of FIGS. 6a and 6b.

The major components of the clock synchronizer 1 are a D-type flip-flop (e.g. 74F74) U1 which is used for delaying CLK2, a NAND gate (e.g. 74F20) U4, an AND gate (e.g. 74F11) U5, and a J-K flip-flop (e.g. 74F109) U2.

The preset input (PR) and the clear input (CL) of the D-type flip-flop U1 are connected to +5 V. The data input (D) receives the CPU reset signal (CPURST) from the interface controller 6. The clock input (C) receives CLK2 from the oscillator 11. The data output (Q) of the flip-flop U1 is a delayed signal (DCPURST) of the CPU reset (CPURST).

NAND gate U4 receives the inverted CPU reset signal (CPURST#) at a first input, the output (Q) of the D-type flip-flop U1 at a second input, and the output (Q) of the J-K flip-flop U2 at a third input. The NAND gate 44 output is connected to the J-input of the J-K flip-flop U2.

AND gate U5 receives the inverted CPU reset signal (CPURST#) at a first input, the delayed CPURST signal (DCPURST) at a second input and the Q output of the J-K flip-flop U2 at a third input. The output of AND gate U5 is connected to K-input of the J-K flip-flop U2. The preset input (PR) and the clear input (CL) of the J-K flip-flop U2 are connected to +5 V. Its clock input (C) receives CLK2 from the oscillator 11. The output of the J-K flip-flop U2 as a function of its inputs is shown in the following logic table:

TABLE 1

| Input | | Output |
|---|---|---|
| (J) | (K#) | (Q) |
| 0 | 0 | 0 |
| 0 | 1 | Q |
| 1 | 0 | ¬Q |
| 1 | 1 | 1 |

Because the output signal from the NAND gate U4 and the output signal from the AND gate U5 are at opposite levels, J and K# will not be "0" concurrently or "1" concurrently. FIG. 6a shows the operation of the J-K flip-flop when CLK1 and CLK2 are in-phase. Between t5 and t6, CPURST#="1" and DCPURST="1", therefore, if CLK2 is low, J will be "1" and K# will be "0" and the output Q of the J-K flip-flop U2 will, as shown in Table 1, will continue to toggle at each cycle of CLK2 which is received at its input (C). Thus, the J-K flip-flop U2 will operate as a frequency divider to divide the frequency of CLK2. In other words, the output Q of the J-K flip-flop U2 will have a clock signal (CLK1) which frequency is half the frequency of CLK2 received at the clock input (C) of the J-K flip-flop U2, as shown in FIG. 6a.

Figure 6B:
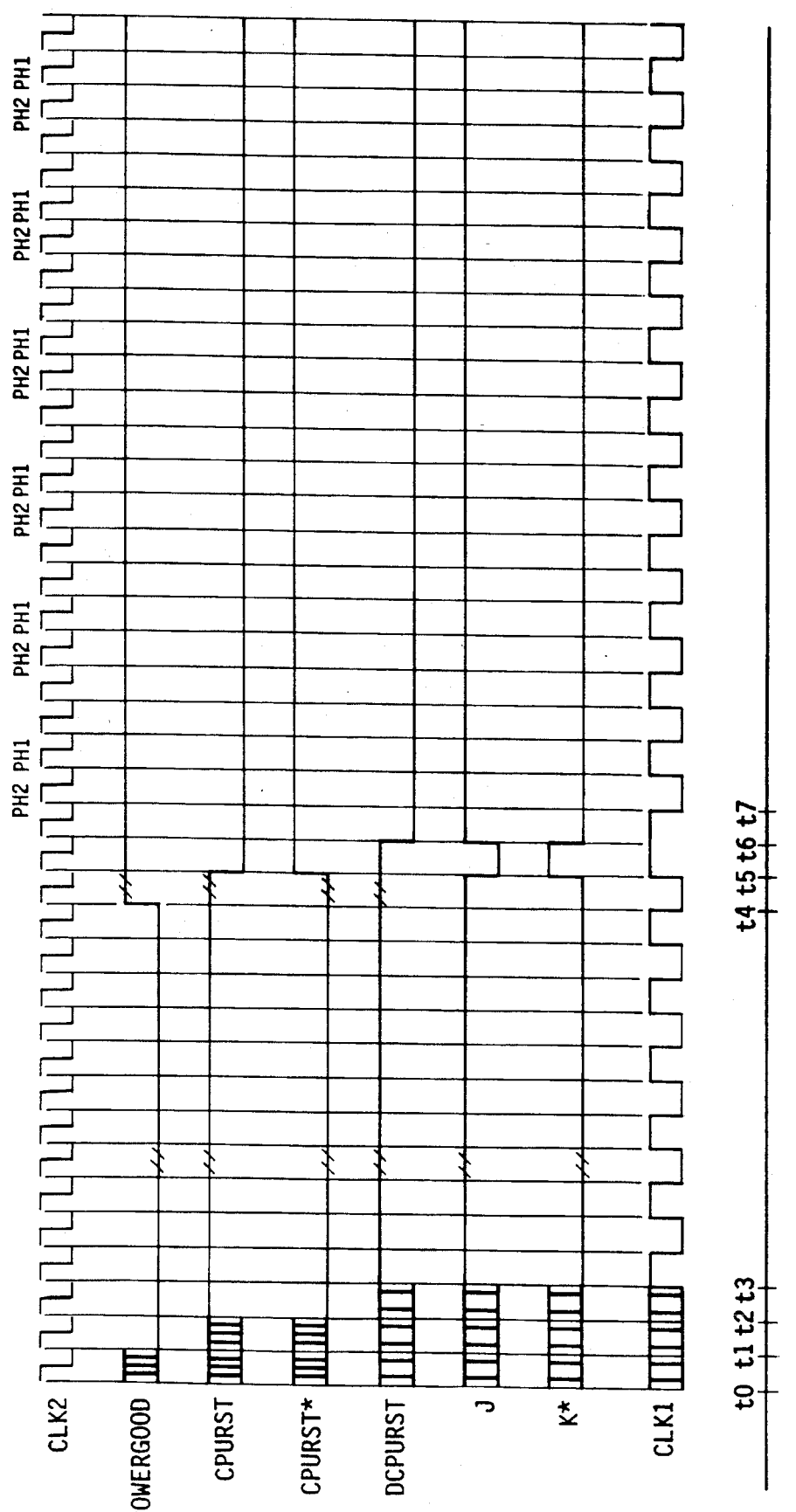

But if CLK2 between t5 and t6 is "1" as shown in FIG. 6b, so that CLK1 is out of phase with CLK2, then J will be "0" and K# will be "1". As shown in Table 1, the output Q of the J-K flip-flop U2 will maintain its previous level. After point t6, however, DCPURST will change to "0", so that J="1" and K#="0", and the output Q of the J-K flip-flop U2 will, as shown in Table 1, resume to toggle at each subsequent cycles of CLK2 received at its input (C), at which time CLK1 and CLK2 will already be in-phase.

Power-Up Sequence

Since there is a possibility that both the first CPU socket 9 and the second CPU socket 7 will be plugged in with a CPU, in which event, the signals from each of the two CPU may result in signal contention at the system bus 12.

Signal contention at the system bus 12 is prevented by controlling the signal levels of the CPUs' pins. Controlling the signal levels of the CPUs' pins is in turn achieved by setting the CPU to a predetermined state.

To set the CPU to a predetermine state, it is first made to go through an internal initialization. For the 80×86 microprocessors, this is performed by applying an external CPU reset signal (CPURST) so as to cause the CPU to enter into RESET. In order to cause a '386 at the first CPU socket 9 to enter into RESET, the power-up sequencer 2 generates a P9RST signal (i.e. P9RST="1") to the '386 in the first CPU socket 9.

Table 2 shows the signal levels at the pins of the '386 at RESET (for example, ADS#="1", D15–D0="F" (floating), BHE#="0", A23–A1="1" and P9HLDA="0").

P9HLDA is actually the HLDA signal of the '386. Because the power sequencer 2 receives a HLDA signal from both the first CPU socket 9 and the second CPU socket 7, this signal is named P9HLDA to more distinctly point out that it is the HLDA signal from the '386. Similarly, the HOLD signal is renamed as P9HOLD for the same purpose.

P9HLDA (i.e. HLDA) is connected to +5 V through a resistor R3, but when '386 enters into RESET, P9HLDA will change from "1" to "0".

TABLE 2

| Pin name | signal state of '386 at reset |
| --- | --- |
| ADS# | 1 (high) |
| D15-D0 | F (float) |
| BHE# | 0 (low) |
| A23-A1 | 1 (high) |
| W/R# | 0 (low) |
| D/C# | 1 (high) |
| M/IO# | 0 (low) |
| LOCK# | 1 (high) |
| P9HLDA (HLDA) | 0 (low) |

Similarly, to cause '486 in the second CPU socket 7 to enter into RESET, a P23RST signal (P23RST="1") is applied from the power-up sequencer 2 to the '486.

Table 3 lists the signal levels of the pins of a '486 (e.g. 80486SX) at RESET. As shown in Table 3, at RESET, the logic states of A31-A2, BE3#-BE0#, PCD, M/IO# D/C#, W/R# BLAST# FERR# are undefined, D31-D0 are in high impedance state, LOCK#, ADS# are in logic "1", and BREQ and P23HLDA are in logic "0".

TABLE 3

| PIN names | Pin level when HOLD and BOFF# are inactive and 486SX is in RESET |
| --- | --- |
| A31-A2 | Undefined |
| BE3#-BE0# | undefined |
| PCD | undefined |
| M/IO# | undefined |
| D/C# | undefined |
| W/R# | undefined |
| BLAST# | undefined |
| FERR# | undefined |
| D31-D0 | high impedance |
| LOCK# | 1 (high) |
| ADS# | 1 (high) |
| BREQ | 0 (low) |
| P23HLDA (HLDA) | 0 (low) |

P23HLDA is actually the HLDA signal of the '486. Because the power sequencer 2 receives a HLDA signal from both the first CPU socket 9 and the second CPU socket 7, this signal is named P23HLDA to more distinctly point out that it is the HLDA signal from the '486.

The BREQ pin of the second CPU socket 7 is connected to the power-up sequencer 2. The BREQ is pulled high to +5 V via a resistor R2 so that if no CPU is plugged into this second CPU socket 7, the BREQ pin will be high. But when a CPU chip is plugged in and when it is at RESET (i.e. when P23RST="1" is sent by the power-up sequencer 2), the level of BREQ will be "0". From the "0" level of BREQ at reset, one can then ascertain that the second CPU socket 7 is plugged in with a '486.

A person skilled in the art will understand that besides HLDA, other pins, such as HLDA, LOCK# and ADS# may also be used for purposes of ascertaining whether a CPU chip is plugged into the socket. However, if a pin such as LOCK# and ADS# are used, then such pin should be pulled to appropriate levels.

To float the output pins of the '386, the power-up sequencer 2 sends P9HOLD="1" to the first CPU socket 9. Upon receiving P9HOLD="1", the '386 in the socket will enter into HOLD and will return P9HLDA="1" to the power-up sequencer 2 to notify the power-up sequencer 2 that '386 has entered into HOLD.

The logic levels of the pins of the '386 in HOLD are listed in the following Table 4:

TABLE 4

| Pin Names | Signal state |
| --- | --- |
| HLDA | High "1" |
| LOCK#, M/IO# | Float |
| D/C#, W/R# | Float |
| ADS#, A23-A1 | Float |
| BHE#, D15-D0 | Float |

Floating output pins of '486 can be achieved by setting it to HOLD.

The condition under which '486 can be put to HOLD is different from that of '386. When '486 is in RESET (P23RST="1") it can receive BOFF#="0" anytime to enter into HOLD state. On the other hand, '386 must have exited the RESET (P9RST="0") before a P9HOLD="1" can cause it to enter into HOLD.

Moreover, putting '486 to HOLD can be done by applying either P23HOLD="1" (as with the '386) or BOFF#="0". ('386 does not have an input pin for BOFF#). But if the P23HOLD is used, '486 will return a P23HLDA signal, which will be sent to various system units such as the power-up sequencer 2 and the interface controller 6. Since the P23HLDA, if sent to the other units, may cause misinterpretation and produce unexpected results, putting the '486 into HOLD in this preferred embodiment is thus performed by setting BOFF#="0" which will not cause '486 to return a P23HLDA signal. Another advantage with using the BOFF#="0" signal is that once it is received, '486 will enter into HOLD immediately.

When '486 enters into HOLD state, its pins will have the levels listed in the following Table 5.

TABLE 5

| Pin name | Signal state |
| --- | --- |
| A2-A31 | Float |
| D0-D31 | Float |
| BE0#-BE3# | Float |
| ADS# | Float |
| M1/0# | Float |
| D/C# | Float |
| W/R# | Float |
| BLAST# | Float |
| LOCK# | Float |
| PCD | Float |
| BREQ | not float |
| P23HLDA (HLDA) | not float |
| FERR# | not float |

By comparing Table 4 with Table 5, it can be seen that when one of the CPUs ('386 or '486) in the system is in HOLD, the output pins of the HOLDed CPU which otherwise would have conflicted with pins of the other CPU will float, and signal contention at the system bus 12 is prevented.

Figure 3:
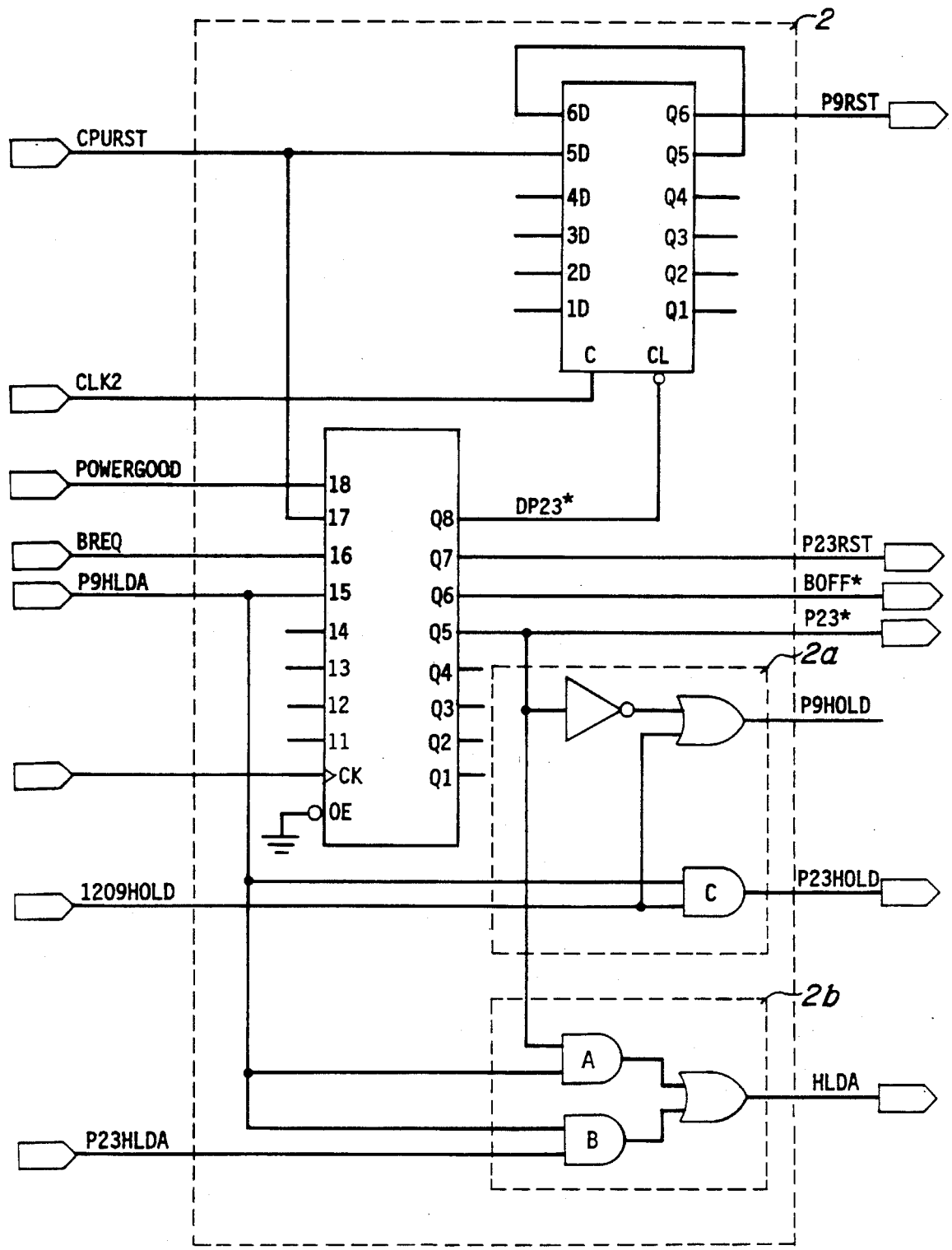
FIG. 3 is a diagram of the power-up sequencer within the system shown in FIG. 1.
Figure 7:
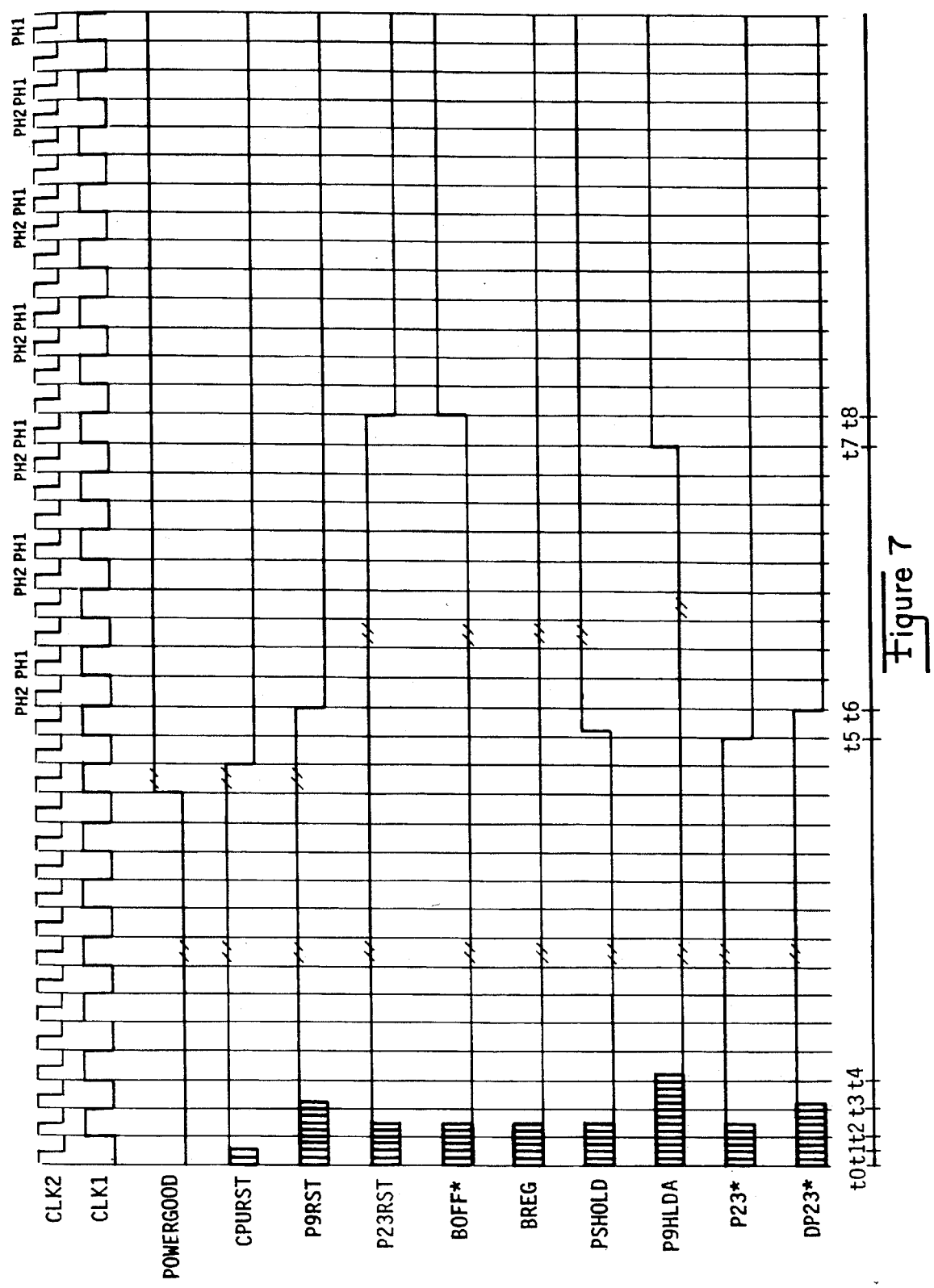
FIG. 7 is a diagram of the timing sequence of the power-up sequencer.
Figure 8A:
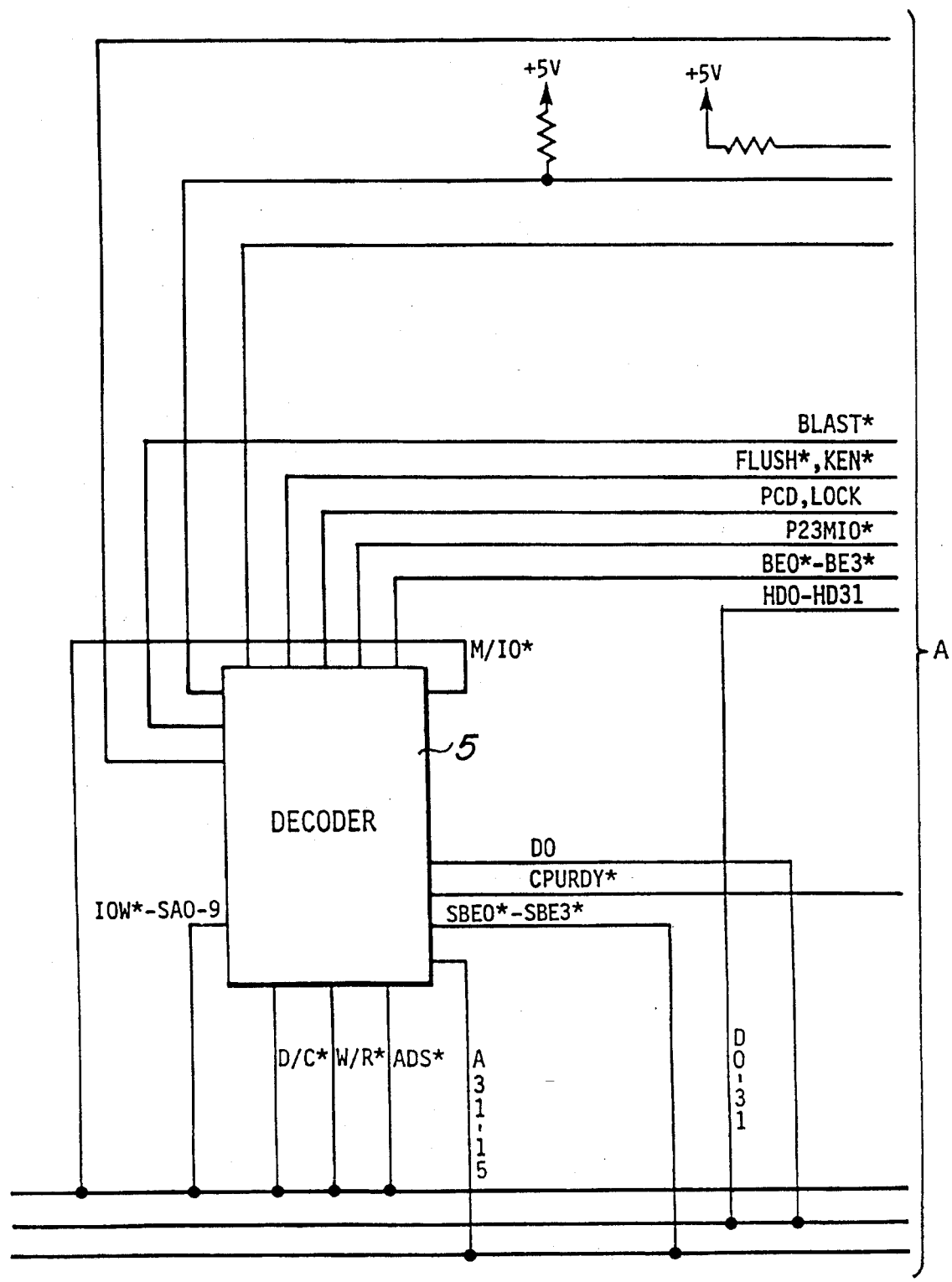
FIGS. 8A, 8B, and 8C are a block diagram of another embodiment of the present invention.
Figure 8B:
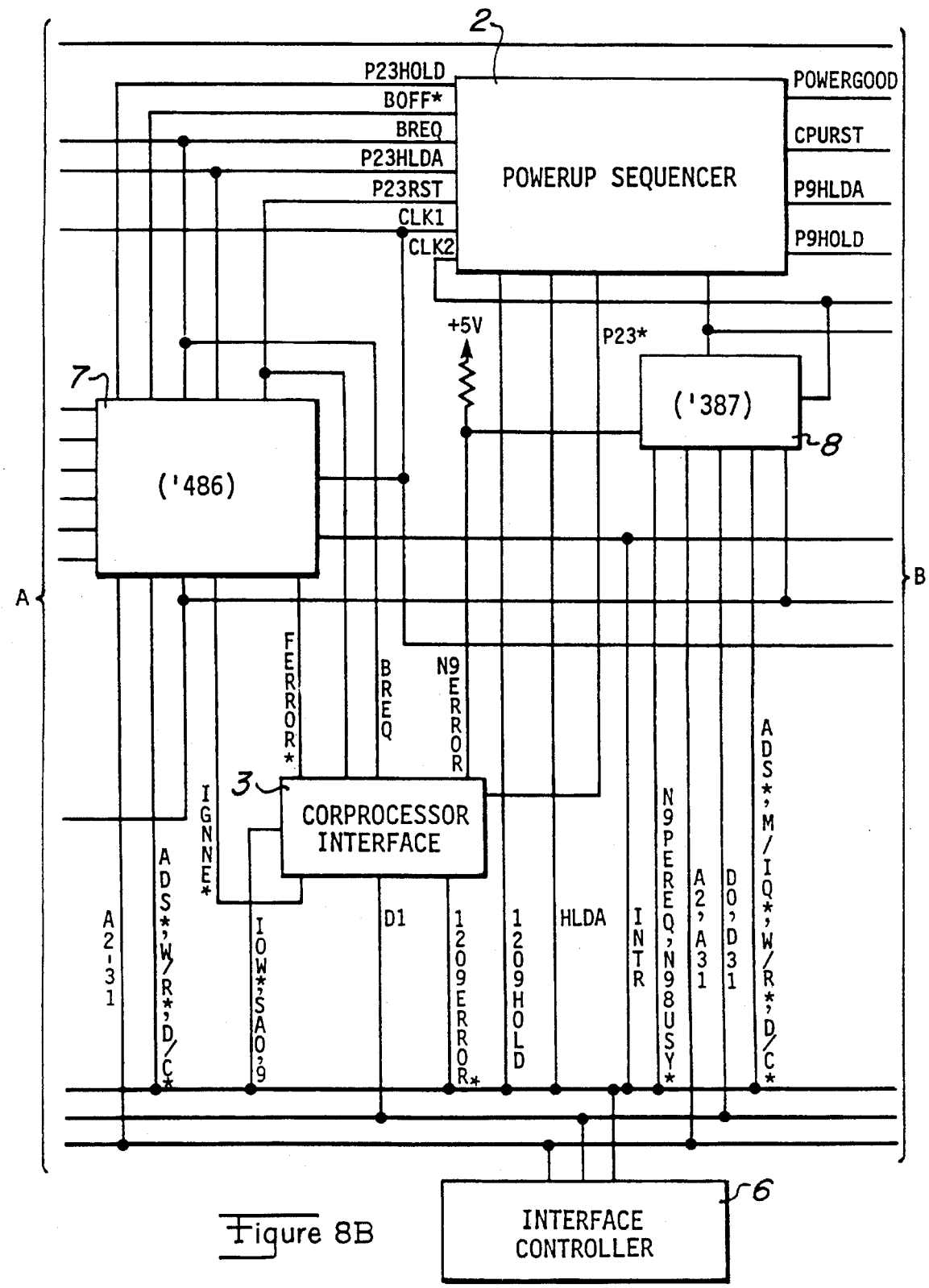
Figure 8C:
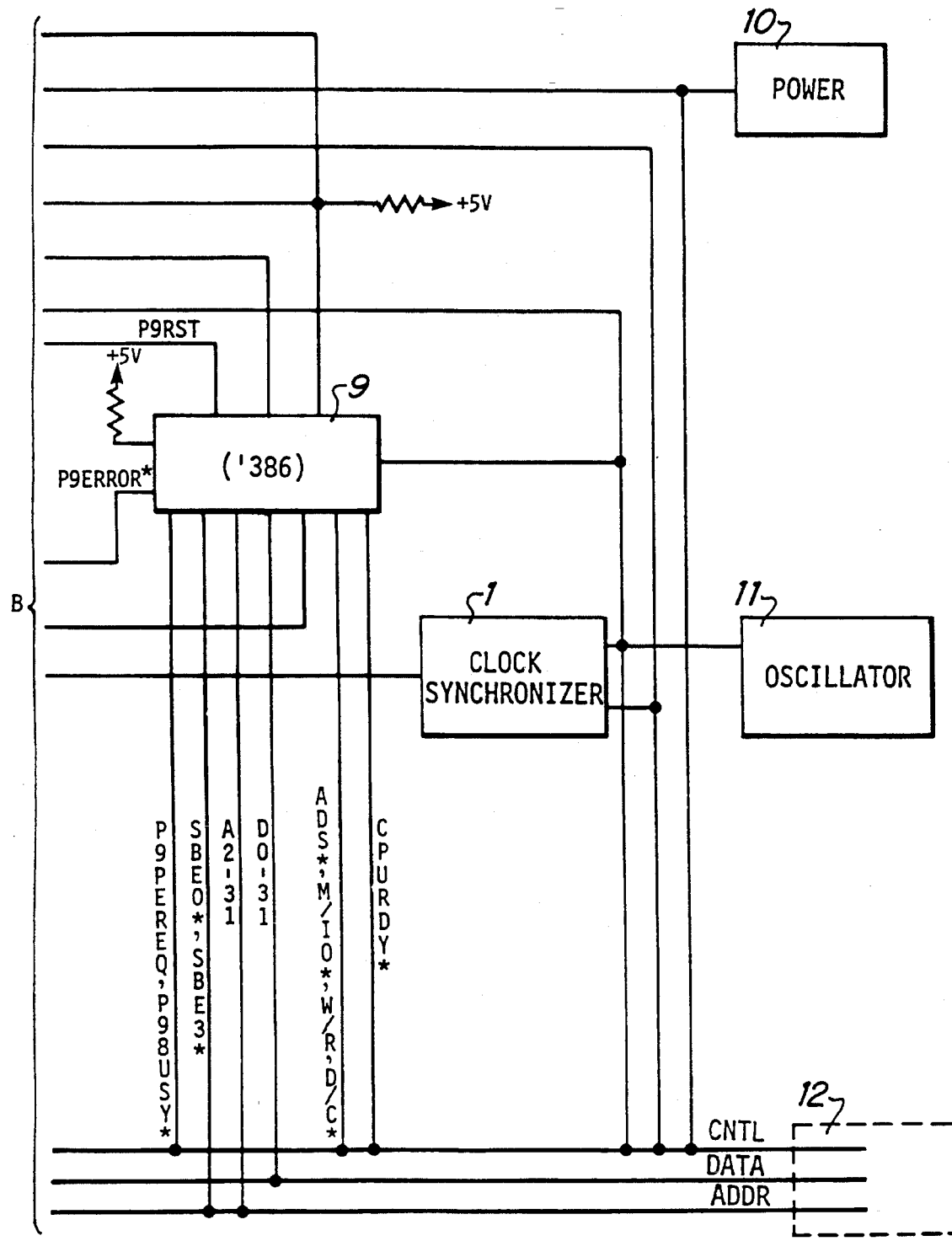

With reference to FIGS. 3, 7 and 1, when power is supplied from the power supply 10, POWERGOOD="0" will be sent from the power supply 10 to the power-up sequencer 2 and the interface controller 6. The interface controller 6, in response to the POWERGOOD="0", sends CPURST="1" to the power-up sequencer 2. In response to CPURST="1", power-up sequencer 2 generates P23RST= "1" to '486 and P9RST="1" to '386.

9

As shown in Tables 2 and 3, when '486 and '386 are both in RESET (P23RST=P9RST="1"), there will be signal contention between the pins of '486 and the pins of '386. Therefore, when power-up sequencer 2 receives P23RST="1", it sends BOFF#="0" to the '486 to cause the '486 to enter into HOLD. Referring to FIG. 3, P9RST="1" is also generated, but it is delayed by a delay circuit U8 (a 74F174). The reason for causing the '486 to enter into HOLD (P23RST="1" and BOFF#="0") first when the '386 is in RESET is to prevent signal contention between the pins of the '386 and the pins of '486. Another reason is because when '386 is in RESET, it cannot enter into HOLD state directly as can the '486.

With reference to Table 2, FIGS. 3 and 7, when '386 is in RESET (P9RST="1"), P9HLDA="0" and HLDA from the power-up sequencer 2 to the interface controller 6 will be "0".

From Tables 3 and 5, it can be seen that when the second CPU socket 7 is plugged in with a '486 chip and when this '486 enters into HOLD (P23RST="1", BREQ="0"), BREQ will be "0". This BREQ="0" signal is sent to the power-up sequencer 2.

As described above, when the interface controller 6 receives POWERGOOD="1" (meaning that power supply is stable), the interface controller 6 will send a CPURST="0" to the power-up sequencer 2. When the power-up sequencer 2 senses CPURST="0" and BREQ="0", it knows that there is a '486 in the second CPU socket 7. A timing control logic means U7 (116R8PAL) in the power-up sequencer 2 will set P23#="0" to inform the system, including the coprocessor interface 3, that there is a '486 in the system. P23#="0" also causes the power-up sequencer 2 to generate the P9HOLD signal to the first CPU socket 9 to put the '386 into HOLD. In addition, the timing control logic means U7 (16R8PAL) generates a delay signal DP23#="0" to the clear input (CL) of delay circuit U8 (74F174), to signal that there is a '486 in the system. DP23#="0" also reset the output P9RST of the delay circuit U8 to "0". By resetting P9RST from "1" to "0", '386 can leave RESET.

When '386 receives P9HOLD="1" from the power-up sequencer 2 (for requesting the '386 to enter HOLD), it will return P9HLDA="1" if it is ready to enter into HOLD. In HOLD, '386 will releases control of the system bus 12. When power-up sequencer 2 receives P9HLDA="1", it will change P23RST from "1" to "0" and BOFF# from "0" to "1" to release '486 from HOLD and allow it to go into normal operation. The result is that '386 is in HOLD and the system now operates with a more powerful CPU—'486.

Coprocessor Interface

As shown in FIG. 1, signals between the '386, '387 and interface controller 6 comprise:

for '386: ADS#(O), M/IO#(O), W/R#(O), A23(O), A2(O) CPURDY#(I), P9ERROR#(I), P9BUSY#(I), P9PEREQ(I) and D0–D15(I/O);

for '387: ADS#(I), M/IO#(I), W/R#(I), A23(I), A2(I), CPURDY#(I), N9RDY#(O) N9ERROR#(O), N9BUSY#(O), N9PEREQ(O), and D0–D15(I/O);

for the interface controller 6: ADS#(I), M/IO#(I), A23(I), CPURDY#(I), N9RDY#(I), N9ERROR#(I) N9BUSY#(I), N9PEREQ(I), P9BUSY#(O) and P9PEREQ(O). ("O" means output, "I" means input, I/O means input/output).

N9ERROR# is connected to +5 V via a resistor R5 (i.e. it is pulled high). If a '387 is not plugged in, N9ERROR# will be high. When a '387 is plugged in and if it receives P9RST="1", it will set N9ERROR# to "0". Therefore, by

10 detecting the level of N9ERROR# after P9RST="1", the presence/absence of '387 can be detected.

For N9ERROR# to change from "0" to "1", an initial command such as FNINIT can be sent from the '386 to the '387 to initiate the '387 to a known state in which N9ERROR# is set to "1". In the preferred embodiment, the interface controller 6 uses the falling edge of the CPURST signal to latch N9ERROR#. If the latched N9ERROR# is "0", then there is a '387 in the system; Conversely, if the latched N9ERROR# is "1", then the system does not have a '387.

'387 operations are initiated when it receives command, data (or operand) from the '386. In executing coprocessor instructions, the '386 will initiate a coprocessor cycle, which is defined as when ADS#="0", M/IO#="0", and A23="1" (or A31="1" if the '386 is a 386DX). When '387 detects the above signals (ADS#="0", M/IO#="0", and A23="1"), it will use the A2 signal to determine whether a command (A2="0") or data (A2="1") is transferred in this coprocessor cycle. The direction of the transmission is determined by the W/R# signal. If W/R# is "0", that means '386 will read information from '387 and if W/R# is "1", that means '386 will send information to the '387.

A coprocessor cycle ends when '387 sends N9RDY#="0" to the interface controller 6 and the Interface controller 6 then sends CPURDY="0" to inform the '386 that the coprocessor cycle is to end. (Any cycle initiated by the '386 is terminated by a CPURDY#="0" to the '386.)

A coprocessor cycle comprises a command phase (which is used for transmitting command) and an operand phase (which is used for transmitting data or operand). In executing a coprocessor instruction, if '386 must transmit an operand, it will first save the address of the operand into an internal data pointer (not shown in the figure) and then initiate the command phase (A2="0") of a coprocessor cycle, and also send the command to the '387.

In general, '386 will check the level of P9BUSY# before it sends a command to '387. P9BUSY#="0" means the '387 is busy and cannot receive another command. On the other hand, P9BUSY#="1" means '387 is not busy and can receive a command from the '386. When '387 receives a command, it will set N9BUSY# to "0".

If '387 wants to send information, it will set N9PEREQ to "1" and send it to the interface controller 6. Upon receiving N9PEREQ="1", the interface controller 6 sends P9PEREQ="1" to the '386. When '386 detects P9PEREQ="1", it will initiate an operand phase of a coprocessor cycle to read data from the '387 to a '386 internal register.

If a coprocessor '387 exists, it will send N9RDY#="0" to the interface controller 6 when execution of the command from the '386 finishes. Interface controller 6, upon detecting a coprocessor cycle (ADS#="0", M/IO#="0", A23="1") and upon receiving N9RDY#="0", will then send CPURDY#="0" to inform the '386 to terminate the coprocessor cycle. On the other hand, if there is no coprocessor in the system, the interface controller 6, upon detecting a coprocessor cycle, will initiate an internal state machine to send CPURDY#="0" to the '386 to terminate the coprocessor cycle.

When '387 is executing a command from the '386, it will send N9BUSY="0" to the interface controller 6. Interface controller 6 will then send P9BUSY#="0" to '386 to indicate that '387 is busy, and to inform the '386 not to initiate another coprocessor cycle. Thus, the '386 cannot execute another coprocessor instruction.

If there is a coprocessor error when '387 is executing a command from the '386, '387 will send N9ERROR#="0" to coprocessor interface 3. Coprocessor interface 3 will then set 1209ERROR#="0" to inform the interface controller 6 that an error has occurred.

When '387 has an error, it will change N9BUSY# from "0" to "1". But N9BUSY#="1" also means that '387 is not busy and can accept a command from the '386. In order not to let '386 mistakenly execute another coprocessor cycle before the removal of a coprocessor error, interface controller 6, when notified a coprocessor error (N9BUSY#="1", 1209ERROR#="0"), will not change P9BUSY# from "0" to "1", but will keep P9BUSY# at "0" so as to prevent '386 from executing another coprocessor cycle. Moreover, interface controller 6 will also send an interrupt (INTR="1") to '386 to request the '386 to process the coprocessor error.

When '386 receives INTR="1", it will execute a coprocessor error handling routine if the interrupt is caused by a coprocessor error. The error handling routine may display, for example, the coprocessor error. The routine may also use an output port to cause the interface controller 6 to set P9BUSY#1 back to "1", so that '386 can initiate a '387 command (e.g. FNINIT) to set N9ERROR#="1" to the coprocessor interface 3.

In response to N9ERROR#="1", coprocessor interface 3 sets 1209ERROR#="1" to the interface controller 6 to inform that the coprocessor error has been removed. The interface controller 6 will then change INTR from "1" to "0" to terminate the interrupt and now '386 is ready to resume operation.

To determine whether its coprocessor exists, '386 executes a coprocessor program and compares the results of the execution against prestored results. If the comparison is positive, that means a '387 is plugged in. If the comparison is negative, then no '387 is plugged in. If a '387 is plugged in, '386 will set the value of a control register (CW) to a certain value so as to allow the '386 to initiate coprocessor cycles.

If no '387 is plugged in, '386 will set the control register (CW) to a different value, and the '386 will be prevented from initiating a coprocessor cycle when a coprocessor instruction is encountered, but instead will generate an interrupt request so that the coprocessor instruction can be handled by an interrupt service routine.

'486 products include 486SX, 486DX and 487SX. With the exception of 486SX, the coprocessor in the other '486 products is internal to the CPU chip. By ascertaining whether the '486 is a 486SX or not, one can determine whether the CPU has an internal coprocessor or not. Ascertaining whether the '486 is a 486SX can be achieved by executing a coprocessor instruction such as FNINIT and then compare the value of a control register CW with a predetermined value. If the comparison is positive, then the '486 is a 486SX.

If the '486 is a 486SX, then it will generate an internal interrupt and transfer control to an interrupt handling routine when it executes a coprocessor instruction. However, if the '486 is not a 486SX (and therefore has an internal coprocessor), the internal coprocessor will be ENABLEd and the '486, in executing coprocessor instructions, can communicate directly with the internal coprocessor and need not execute an external coprocessor cycle.

Figure 4:
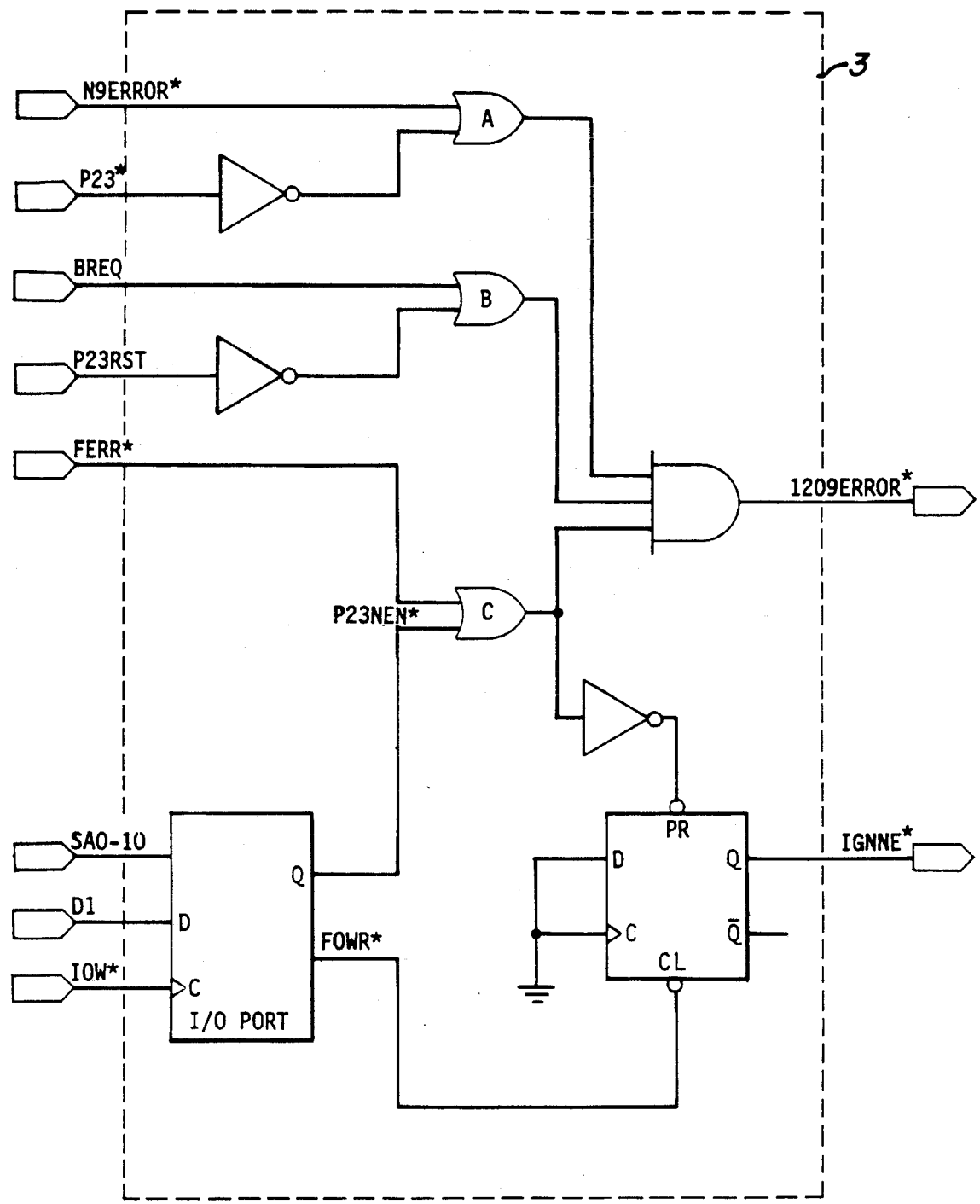
FIG. 4 is a diagram of the coprocessor interface within the system shown in FIG. 1.
Figure 5A:
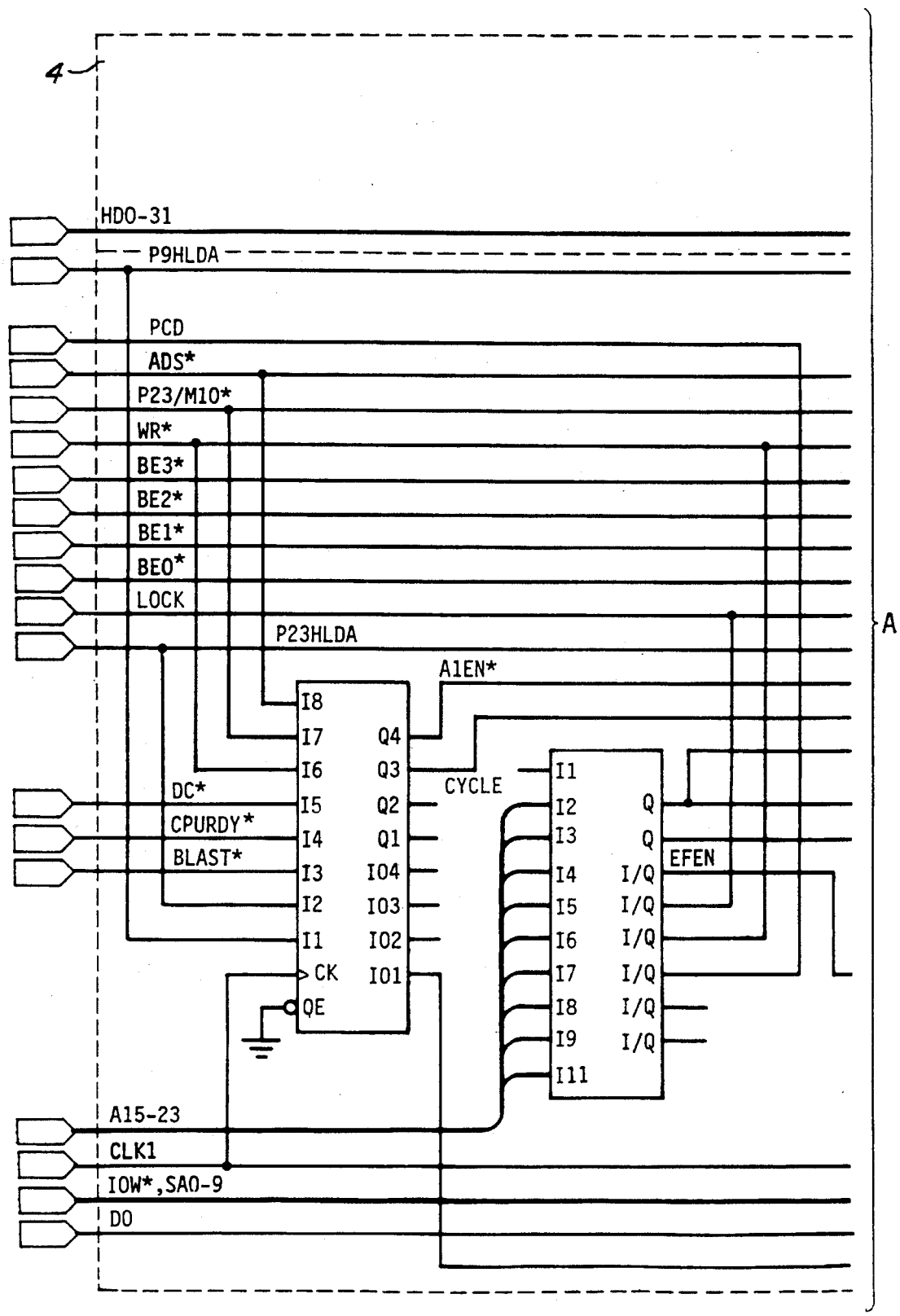
FIGS. 5A and 5B are a diagram of the bus interface within the system shown in FIG. 1 shown in FIG. 1.
Figure 5B:
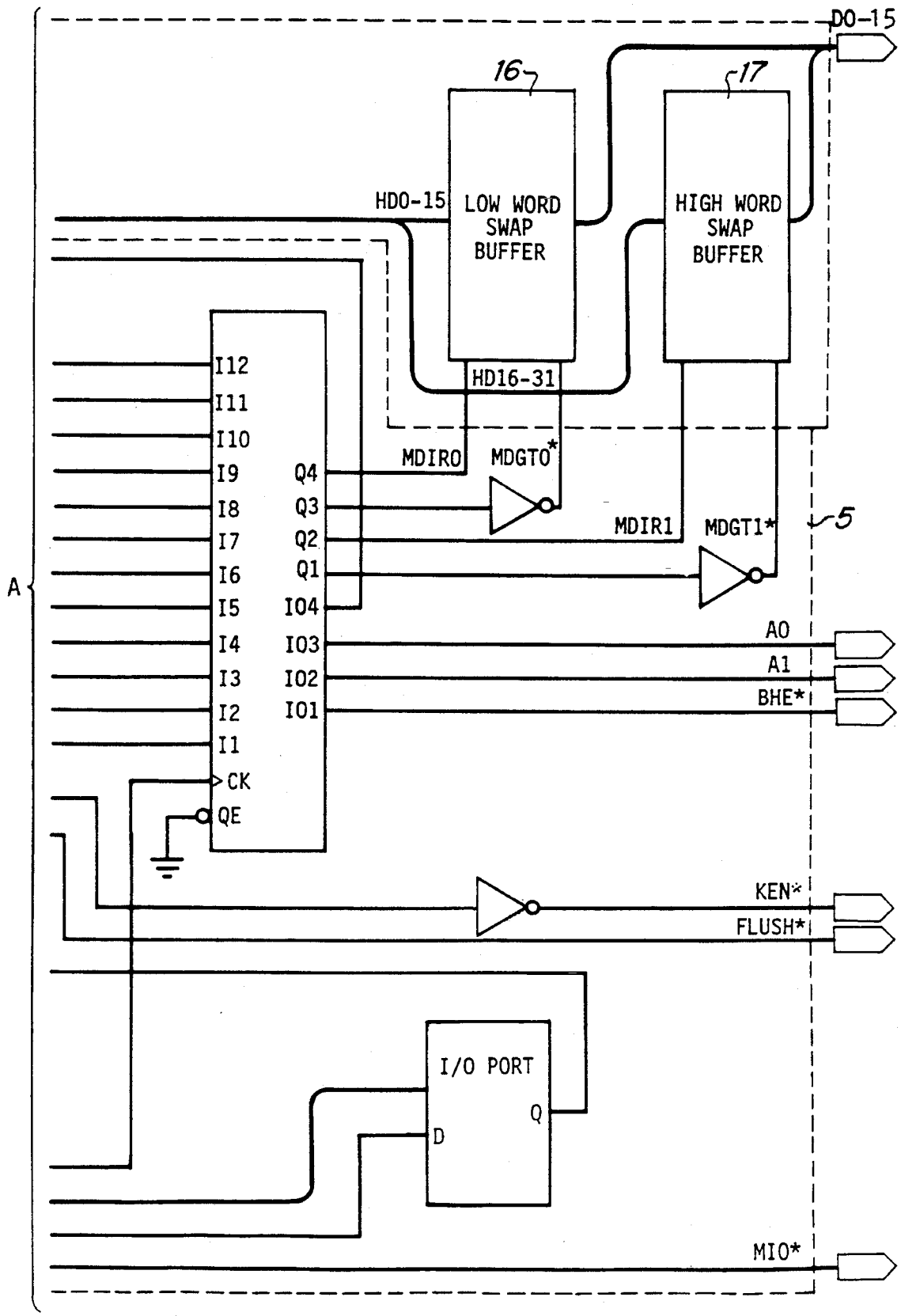

FIG. 4 is a diagram of a preferred implementation of the coprocessor interface 3. As shown in FIG. 4, the basic output signals of the coprocessor interface 3 are 1209ERROR# and IGNNE#.

When the CPU is in RESET (CPURST="1"), the 1209ERROR# signal can be used to indicate whether a coprocessor exists (e.g. when 1209ERROR#="0", that means a coprocessor exists). During normal operating condition (CPURST="0"), 1209ERROR# is used to indicate whether a coprocessor error has occurred (if there is a coprocessor error, then 1209ERROR="0", if there is no coprocessor error, then 1209ERROR="1").

IGNNE# is an input signal to the '486. In normal operation, IGNNE#="1" means that a coprocessor error has occurred when '486 is processing a coprocessor instruction, and the '486 can no longer continue executing the coprocessor instruction. '486, by executing a coprocessor error handling routine, can change IGNNE# from "1" to "0" by writing to an input port.

The operation of the coprocessor interface 3 is explained with reference to FIG. 4. As shown, the coprocessor interface 3 comprises a first OR gate (774F32, U127A), a second OR gate (74F32, U127B), a third OR gate (74F32, U127C), an AND gate (74F11, U107), an input/output port U53 and a flip-flop (74F74, U109).

Refer to the first OR gate U127A. As previously described, P23# will be set to "1" when there is no '486 in the system. N9ERROR# will be "0" when there is a 387X and when the 387X is in RESET (P9RST="1"). Thus, 1209ERROR# will be "0" and P23# will be "1" when the system has a '387 and no '486.

If there is a '486 in the system, BREQ will be "0" when '486 is in RESET (P23RST="1"). The second OR gate 127B will thus output a "0". The AND gate U107 will therefore output 1209ERROR#="0" when there is a '486.

If the '486 is a CPU (e.g. a 486SX) that does not have an internal coprocessor (e.g. 486DX), then 1209ERROR# will be "0", and the interface controller 6 will know that a coprocessor exists. As 486SX will not issue a coprocessor cycle, there will be no conflicting results.

For systems that only have '387 and not '486, when there is a coprocessor error in the '387, because p23#="1", 1209ERROR# will be "0", and the interface controller 6 will be informed of a coprocessor error. As previously described, the interface controller 6 will send an interrupt request INTR="1" to the '386 to request the '386 to process the coprocessor error.

In systems that have a '486, when there is no coprocessor error in the '486, FERR# to the third AND gate U127C will be "1", this signal will be inverted into "0" by the inverter U111 which is then input to the preset input (PR) of flip-flop U109. As a result, the output (Q) of the flip-flop U109 will be preset to "1", that is, IGNNE#="1". Note that if the '486 is a 486SX, the P23NEN# signal to the third AND gate U126 is set to "1" by the input/output port U53. If the '486 has an internal coprocessor, P23NEN# will be "0", '486 errors which may be caused to the '486 by the unstable state of FERR# are prevented.

When there is a coprocessor error in a '486 which has an internal coprocessor, FERR#="0" and P23NEN#="0", the signal input to pin 5 of the AND gate U107 will be "0". As a result, output of the AND gate U107 will be "0", which means that 1209ERROR# will be "0". The interface controller 6 is thereby informed that there exists a coprocessor error. Interface controller 6 then sends INTR="1" to the '486 to request the '486 to process the coprocessor error.

When the '486 receives INTR="1", if it ascertains that a coprocessor error has occurred, it will execute a coprocessor error handling routine. The coprocessor handling routine can, for example, display the coprocessor error, or it can send a FOWR="0" signal through the I/O port U53 (with SA0-SA10 and IOW#) to the clear input (CL) of flip-flop U109 to clear IGNNE# to "0".

When '486 senses IGNNE#="0", it can once again execute coprocessor instructions. By executing coprocessor instructions, the '486 will set FERR# from "0" to "1" and thereby presetting flip-flop U109 to change IGNNE# back to "1" and changing 1209ERROR# to "1". The interface controller 6 will, as a result, change INTR from "1" to "0" so as to remove the coprocessor error in the '486 and terminate interrupt request to the '486 to allow '486 to resume normal operation.

Bus Interface

386SX uses the high portion address (A2–A23) to access 32-bit units of information. It uses A1 of the low portion address (A0, A1, BHE#) to select either a high or a low word from the accessed 32-bit unit. It uses A0 and BHE# to select either a word, a low 8-bit byte or a high 8-bit byte.

'486 uses the high portion address (A2-A31) to access 32-bit units (D0–D31) of information. It uses the low portion address (BE3#, BE2#, BEI#, BE0#) to determine whether to access the whole 32 bits, or 24 bits, 16 bits or 8 bits therefrom.

'486 has a high speed cache into which '486 stores a unit of 128 bits of information accessed from the external memory in one cache read cycle.

In addition, as previously described, when the system has both a '386 and a '486, certain pins of either the '386 or '486 must be put into in float state or their outputs be inhibited so as to prevent signal contention.

Therefore, for a motherboard to be able to operate with either a '486 or '386, a bus interface must be provided whereby signals from different types of CPU can be converted and processed.

External activities of the CPU are executed in CPU cycles. A CPU cycle is terminated by a CPURDY="0" signal sent from outside of the CPU (e.g. interface controller 6). Tasks to be executed by a '486 in a CPU cycle are defined by M/IO#, W/R# and D/C# as listed in Table 6.

TABLE 6

| M/IO# | W/R# | D/C# | Task definitions |
|---|---|---|---|
| 0 | 0 | 0 | Interrupt acknowledge |
| 0 | 1 | 0 | special cycle |
| 0 | 0 | 1 | read data from I/O |
| 0 | 1 | 1 | write data to I/O |
| 1 | 0 | 0 | prefetch instructions |
| 1 | 1 | 0 | X X X |
| 1 | 0 | 1 | Read data from memory |
| 1 | 1 | 1 | write data to memory |

The interface controller 6 and the system bus 12 can be 16 bits or 32 bits long. For a '386 system with a system data bus 12 of 16 bits long, the high portion address (A2–A23) is used to address units of 32 bits of data, A1 of the low portion address is used to address either the high word or the low word from the 32-bit data and A0 and BHE# are used to determine whether to access a word, the high 8-bit byte or the low 8-bit byte. The preceding data access is listed in Table 7.

TABLE 7

| A1 | A0 | BHE# | Access mode | data size |
|---|---|---|---|---|
| 1 | 0 | 0 | high word | D0-D15 |
| 1 | 0 | 1 | high word low byte | D0-D7 |
| 1 | 1 | 0 | high word high byte | D8-D15 |
| 1 | 1 | 1 | X | X |
| 0 | 0 | 0 | low word | D0-D15 |
| 0 | 0 | 1 | low word low byte | D0-D7 |
| 0 | 1 | 0 | low word high byte | D8-D15 |

TABLE 7-continued

| A1 | A0 | BHE# | Access mode | data size |
|---|---|---|---|---|
| 0 | 1 | 1 | X | X |

When the system data bus 12 is 32 bits long, the high portion address (A2–A31) is used to access units of 32 bit of data (D0–D31), the low portion address (BE0#, BE1#, BE2# and BE3#) is used to access either the whole 32 bits or 24 bits, 16 bits or 8 bits thereof. 24 bits from the 32-bit unit can be accessed either as D0–D23 or as D8–D31. 16 bits from the 32-bit data can be accessed either as D0–D15, D8–D23 or D16–D31. 8 bits from the 32-bit unit can be accessed as D0–D7, D8–D15, D16–D23 or D23–D31. The data access described in the preceding is more clearly shown in Table 8.

TABLE 8

| BE3# | BE2# | BE1# | BE0# | access length | Data accessed |
|---|---|---|---|---|---|
| 0 | 0 | 0 | 0 | 32 bits | D0-D31 |
| 0 | 0 | 0 | 1 | 24 bits | D8-D31 |
| 1 | 0 | 0 | 0 | 24 bits | D0-D23 |
| 0 | 0 | 1 | 1 | 16 bits | D16-D31 |
| 1 | 0 | 0 | 1 | 16 bits | D8-D15 |
| 1 | 1 | 0 | 0 | 16 bits | D0-D15 |
| 0 | 1 | 1 | 1 | 8 bits | D24-D31 |
| 1 | 0 | 1 | 1 | 8 bits | D16-D23 |
| 1 | 1 | 0 | 1 | 8 bits | D8-D15 |
| 1 | 1 | 1 | 0 | 8 bits | D0-D7 |

Under normal operation, '486 initiates a CPU cycle to access either 32 bits, 24 bits, 16 bits, or 8 bits of information. But when connected to a system with a 16-bit data bus, '486 cannot use its 32-bit internal bus (HD0–HD31) to access 32 bits of data. In this case, according to the specifications of '486, an input pin (BS16#) of the '486 must first be pulled low, so that '486 can automatically set its data bus (HD0–HD31) to either a low word portion (HD0–HD15) or a high word portion (HD16–HD31).

But in such a case, if '486 wants to access 32 bits of data, it will initiate two CPU cycles, the first CPU cycle to access the low word portion (HD0–HD15) and the second CPU cycle to access the high word portion (HD16–HD31). If the '486 wants to access 24 bit data at HD0–HD23, then '486 will initiate two CPU cycles, the first CPU cycle to access HD0–HD15 and the second CPU cycle to access HD16–HD24. But if the 24-bit data is in HD8–HD31, then the first CPU cycle will be used to access HD8–HD15 and the second CPU cycle will be used to access HD16–HD31.

If '486 wants to access 16 bits of data at HD0–HD15, it will use one CPU cycle to access HD0–HD15. And if the 16 bits of data is at HD16–HD31, 486 will also use one CPU cycle to access it. If the '486 wants to access 8 bits of data, it will only use one CPU cycle to access the data using the address of the 8-bit data (e.g. HD24–HD31, HD16–HD23, HD8–HD15, HD0–HD7).

'486 has an internal cache of 8 kilobytes. The cache is arranged into 512 lines each with 128 bits. Cache operations will result in either a "cache read hit", a "cache read miss", a "cache write hit" or a "cache write miss".

"Cache read hit" and "cache write hit" mean that the data accessed by the '486 is already in the cache and can be accessed directly without having to execute a memory read cycle (e.g. to the interface controller 6) to access such data from external memory.

'486 has an input pin, KEN#. When '486 issues a memory read cycle to the external memory and KEN# is set to "0", that means that the cycle is a "cacheable memory read cycle"

(also called a "cache line fill cycle"). "Cacheable memory read cycle" means that when a CPU reads data from the external memory, such data will also be put into the cache.

When '486 issues a memory read cycle to the external memory and KEN# is set to "1", that means the cycle is a "non-cacheable memory read cycle". "Non-cacheable memory read cycle" means that when a CPU reads data from the external memory, such data will not be put into the cache. In "non-cacheable memory read cycle", '486 can uses high portion address (A2–A31) and low portion address (BE3#-BE0#) to access 32 bits, 24 bits, 16 bits or 8 bits of data, and need not store that data into the cache.

"Cache read/write cycle" means the '486 is accessing 128 bits of data from the external memory. If only 32 bits of data is accessed with each memory cycle, then '486 will have to issue 4 memory read cycles to complete a cache cycle. When '486 is connected to a system with 16-bit bus and BS16# is pulled low ("BS16#="0"), it must issue 8 memory read cycles to complete each cache cycle.

The internal cache of the '486 can be set either to ENABLE or DISABLE by program. Whether the internal cache is enabled can be detected from the outside from a '486 output PCD.

To determine whether it can enter into a cacheable memory read cycle after '486 has initiated a memory read cycle, '486 checks KEN# and whether the internal cache of the '486 is enabled, as well as whether that memory read cycle is a lock cycle.

"Lock Cycle" means the '486 needs to issue multiple CPU cycles to the external in executing an instruction and that '486 will not relinquish control (e.g. it will not accept the P23HOLD signal from the power-up sequencer 2, which will put the '486 into HOLD) before completion of these CPU cycles. Whether the CPU cycle initiated is a LOCK cycle can be detected from the LOCK# pin. (LOCK#="0" means that a CPU cycle is a LOCK cycle, LOCK#="1"

then '486 must initiate two CPU cycles. In the first CPU cycle, the '486 changes the low portion address (BE3#-BE0#) to (A0, A1, BHE#) to read the low word portion, as shown in Table 9. In the second CPU cycle, the '486 changes the low portion address (BE3#-BE0#) to (A0, A1, BHE#) to read the high word portion.

TABLE 9

| BE3# | BE2# | BE1# | BE0# | A0 | A1 | BHE# |
|------|------|------|------|----|----|------|
| 0 | 0 | 0 | 0 | 0 | 0 | 0 |
| 0 | 0 | 0 | 1 | 1 | 0 | 0 |
| 1 | 0 | 0 | 0 | 0 | 0 | 0 |
| 0 | 0 | 1 | 1 | 0 | 1 | 0 |
| 1 | 1 | 0 | 0 | 0 | 0 | 0 |
| 0 | 1 | 1 | 1 | 1 | 1 | 0 |
| 1 | 0 | 1 | 1 | 0 | 1 | 1 |
| 1 | 1 | 0 | 1 | 1 | 0 | 0 |
| 1 | 1 | 1 | 0 | 0 | 0 | 1 |

The relationship between the low portion address (BE3#-BE0#) sent out in the first CPU cycle, and the low portion address (BE3#-BE0#) sent out in the second CPU cycle; along with the relationship between the low portion address (BE3#-BE0#) sent out in the second CPU cycle, and the low portion address (A0, A1, BHE#) changed therefrom for reading the high word portion, are listed in Table 10.

In Table 10, "X" represents that the second cycle is unnecessary and that there is no need to make a second conversion.

TABLE 10

| 1st cycle | | | | 2nd cycle | | | | relation to 2nd cycle | | |
|---|---|---|---|---|---|---|---|---|---|---|
| BE3# | BE2# | BE1# | BE0# | BE3# | BE2# | BE1# | BE0# | A0 | A1 | BHE# |
| 0 | 0 | 0 | 0 | 0 | 0 | 1 | 1 | 0 | 1 | 0 |
| 0 | 0 | 0 | 1 | 0 | 0 | 1 | 1 | 0 | 1 | 0 |
| 1 | 0 | 0 | 0 | 1 | 0 | 1 | 1 | 0 | 1 | 1 |
| 0 | 0 | 1 | 1 | x | x | x | x | x | x | x |
| 1 | 0 | 0 | 1 | 1 | 0 | 1 | 1 | 0 | 1 | 1 |
| 1 | 1 | 0 | 0 | x | x | x | x | x | x | x |
| 0 | 1 | 1 | 1 | x | x | x | x | x | x | x |
| 1 | 0 | 1 | 1 | x | x | x | x | x | x | x |
| 1 | 1 | 0 | 1 | x | x | x | x | x | x | x |
| 1 | 1 | 1 | 0 | x | x | x | x | x | x | x | means that it is not a LOCK cycle).

The following is a description of how the low portion address (BE3#, BE2#, BE1# BE0#) of the '486 format (32 bit architecture) are changed to the low portion address (A0, A1, BHE#) of the '386 format (16 bit architecture).

As described previously, to enable the '486 to operate with a data bus of 16 bits long, besides pulling down BS16#, the low portion address (BE3#-BE0#) of the '486 format must be converted into the low portion address (A0, A1, BHE#) of the '386 format.

In other words, during a non-cacheable memory read cycle, when the '486 detects from the low portion address (BE3#-BE0#) that the data it accesses is more than 16 bits long or when the data extends between low word portion (HD0–HD15) and the high word portion (HD16–HD31), In executing a cacheable memory read cycle, '486 will ascertain that it is executing a cacheable memory read cycle only after it senses KEN#="0", PCD="0", LOCK#="1" at the first memory read cycle.

Therefore, the '486 begin a cacheable memory read cycle with the assumption that it is a non-cacheable memory read cycle. After it ascertains that it is in a cacheable memory read cycle, '486 will enter into a cacheable memory read cycle from a non-cacheable memory read cycle. But in this way, during the cacheable memory read cycle, because the low portion address (BE3#-BE0#) sent out by the '486 during the first memory read cycle may only read 24 bits, 16 bits or 8 bits of data, the data read by the '486 before finishing the cacheable memory read cycle may not be 128 bits.

To ensure that the '486 read 128 bits of data after a cacheable memory read cycle, the low portion address (BE3#-BE0#) sent by the '486 in the first memory read cycle is ignored and replaced by a low portion address which forces the '486 to read 32 bits of data in the first memory cycle using. For example, when the low portion address (BE3#-BE0#) in the first memory read cycle is "0011", A0, A1, BHE# should be "010" (see table 9) during the non-cacheable memory read cycle. But during the cacheable memory read cycle, A0, A1, BHE# will be forced to "000". This ensures that during the cacheable memory read cycle, the data read in the first memory read cycle is 32 bits.

The bus interface 15 according to the present invention comprises a low word swap buffer 16, a high word swap buffer 17 and a decoder 5.

The main functions of the low word swap buffer 16 and the high word swap buffer 17 is to convert data between the 32-bit (HD0–HD31) data bus and the 16-bit system data bus. The control signals (MDGT0#, MDIR0; MDGT11#, MDIR1) for controlling the conversion come from the decoder 5.

MDGT0# and MDGT1# are used to enable or disable the low word swap buffer 16 and the high word swap buffer 17 respectively. MDIR0 and MDIR1 are used to control the direction of data to/from both the low word swap buffer 16 and the high word swap buffer 17. For example, when MDGT0#="0", the low word swap buffer 16 will be enabled; when MDGT0#="1", the low word swap buffer 16 will be disabled; when MDIR0="0", the 16-bit low word data (HD0–HD15) will be allowed to be sent the system data bus; and when MDIR0="1", the 16-bit data (D0–D15) from the system data bus will be sent to the CPU data bus (HD0–HD15). MDGT1# and MDIR1 are used to control the high word swap buffer 17, its operation is similar to that of MDGT0 and MDIR0.

Besides generating the control signals (MDGT0#, MDIR0, MDGT1# and MDIR1) to control the enabling/disabling and direction of data of the low word swap buffer 16 and the high word swap buffer 17, the decoder 5 also changes the low portion address (BE3#, BE2#, BE1#, BE0#) of the '486 format into the low portion address (A0, A1, BHE#) of the '386 format.

Decoder 5 comprises three programmable array logic (16R4PAL, U9; 16LSPAL, U10; 20R4PAL, U11) and a programmable output port U15.

A basic function of the 16R4PAL U9 is to generate CYCLE and A1EN#. When ADS#="0" and P9HLDA="1", CYCLE will change from "0" to "1" and will stay in "1" until CPURDY#="0" when it will go back to "0". Therefore, CYCLE defines a CPU cycle in which 16LSPAL U10 and 20R4PAL U11 can send out signals such as KEN# and FLUSH#.

When a CPU requests a certain number of bits of data from the interface controller 6 (e.g. external memory), such data may be sent in sub-units. BLAST# is provided to indicate when all requested data have been sent. For example, in accessing a line of cache data (128 bits), the data may be sent in 8 sub-units each of which is 16 bits long. The BLAST# will be high when the first 7 sub-units are sent and will be low at the time when the last sub-unit is sent.

A1EN# changes from "0" to "1" when BLAST#="1" and CPURDY#="0". A1EN# will change back to "0" when BLAST#="0" and CPURDY#="0". Thus, BLAST#="0" and CPURDY#="0" can be used to indicate the end of a CPU cycle. In other words, if A1EN# is "0", then the subsequent CPU CYCLE will be the beginning of a new CPU cycle. Therefore, the low portion address (BE3#= BE0#) sent by the '486 during the first CPU cycle can be changed to A0=A1=BHE#="0" using A1EN#="0", PCD="0", KEN#="0" and LOCK#="1". This will ensure that the '486 reads the 32 bits in the first cacheable cycle.

The 16L8PAL U10 operates to generate KEN# and FLUSH#. KEN# is used to indicate to the '486 whether the CYCLE is a cacheable cycle. If an accessed address (e.g. A15–A23) falls within the area available for cacheable memory read and/or cacheable write and if the internal cache of the '486 is enabled (PCD="0"), then KEN#="0". If the address falls outside the area available for cacheable access or if the internal cache of the '486 is disabled (PCD="1"), then KEN#="1".

FLUSH# is used to signal to the '486 as to whether the internal cacheable needs to be flushed. For example, when the address sent by the '486 in the cacheable write cycle falls outside of the cacheable area (e.g. in area reserved for the basic input/output system, BIOS), then FLUSH#="0".

20R4PAL U11 operates mainly to generate MDGT0# and MDIR0 which are used to control the low word swap buffer 16. It also generates MDGT1# and MDIR1 which are used to control the high word swap buffer 17. In addition, 20R4PAL U11 functions to convert the low portion address (BE3#, BE2#, BE1# BE0#) of a 32-bit system into low portion address (A0, A1, BHE#) of a 16-bit system, in accordance with that shown in Table 10. This conversion is performed under the control of ADS#, P23M/IO#, W/R# CYCLE, A1EN#, LOCK# and PCD.

The programmable input/output port U15 of the decoder 5 writes data (D0) in response to input operation (IOW#, SA0–SA9). As a result, 16L8PAL U10 can, within specified address area, use software control to change the decoding address range of KEN# and FLUSH#.

When '386 enters RESET, (P9RST="1" P9HLDA="0"), it will output A0, A1 and BHE# (see Table 2). Similarly, when '486 enters RESET (P23RST="1", P23HLDA="0"), it will output BE3#-BE0# (see Table 3). Therefore, to avoid signal contention when '386 and '486 coexist, P9HLDA="0" is sent to decoder 5 to prevent '486 from using decoder 5 to change (BE3#-BE0#) to (A0, A1, BHE#) when '386 is in RESET.

In addition, when the '486 enters into HOLD (P23HLDA="1"), BE3#-BE0# will float (see Table 5). Therefore, P23HLDA="1" is sent to decoder 5, so that the (A0, A1 and BHE#) which decoder 5 changes from (BE3#-BE0#) will also float. Because P23HLDA is pulled high (+5 V) when the second CPU socket 7 is not plugged in with a '486, the (A0, A1 and BHE#) from decoder 5 will also float, in conformance to the specifications.

Figure 8:
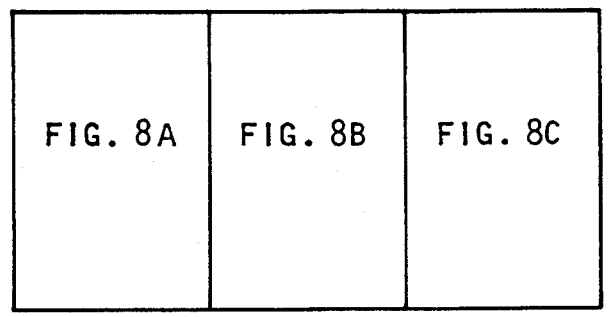
FIG. 8 is a map showing the arrangement of FIGS. 8A, 8B, and 8C to form a complete figure.
Figure 5:
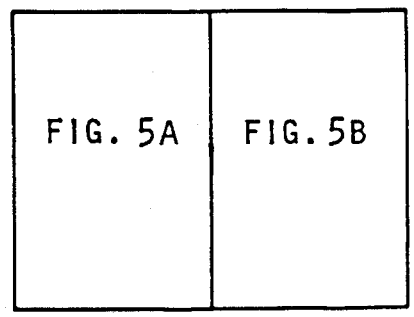
FIG. 5 is a map showing the arrangement of FIGS. 5A and 5B to form a complete figure.
Figure 1A:
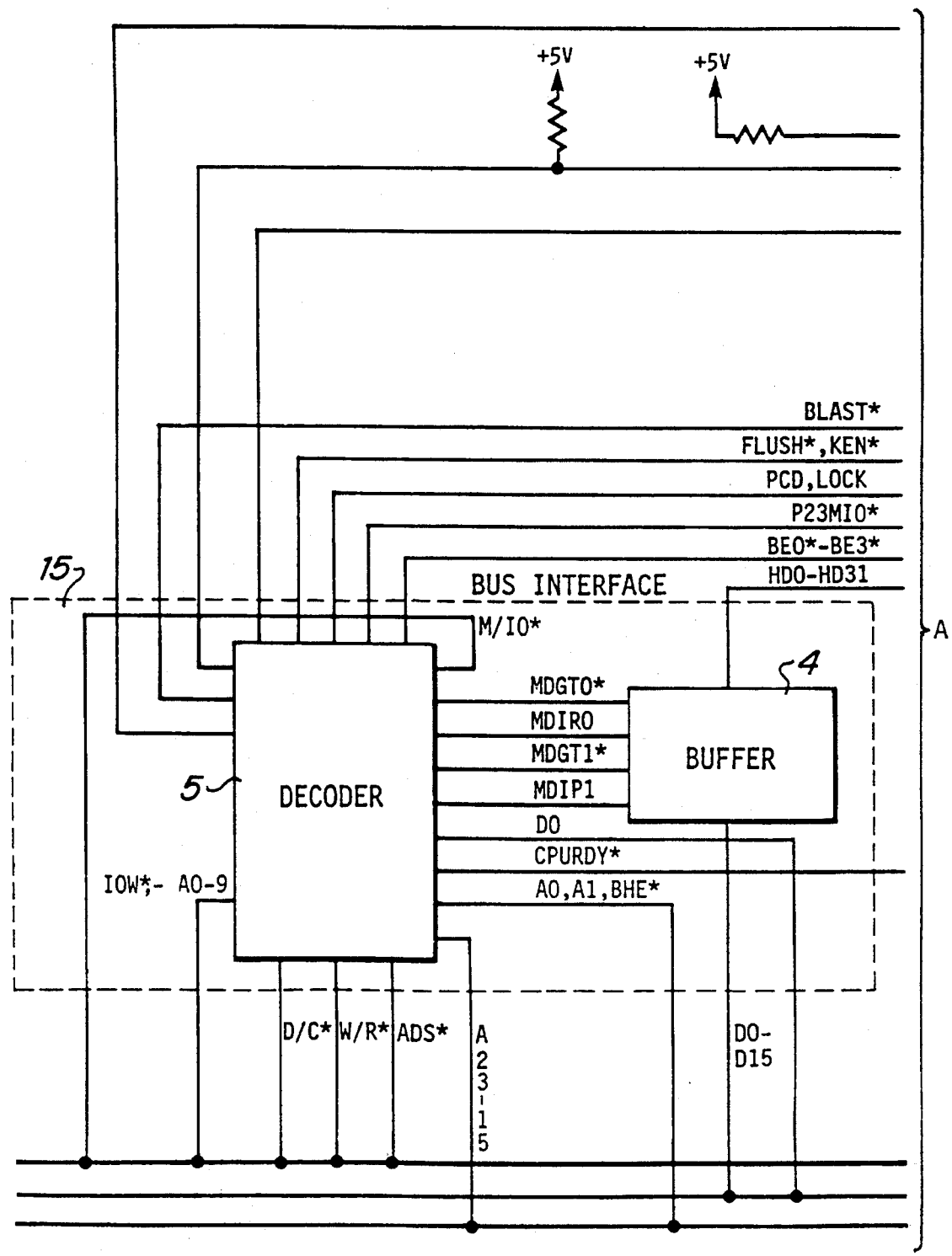
FIGS. 1B and 1C are a block diagram of part of a computer system in which the present invention is embodied.
Figure 1B:
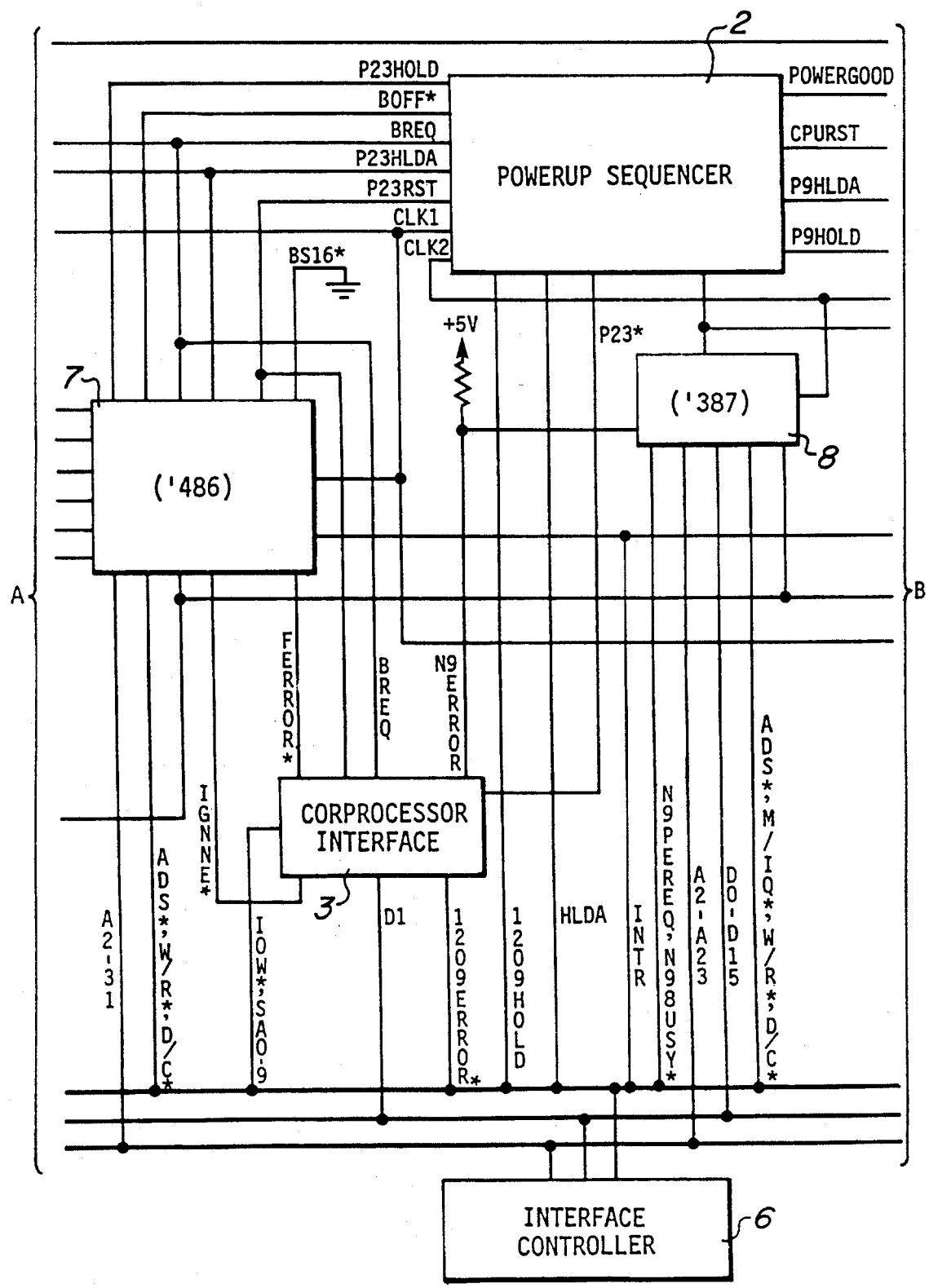
Figure 1C:
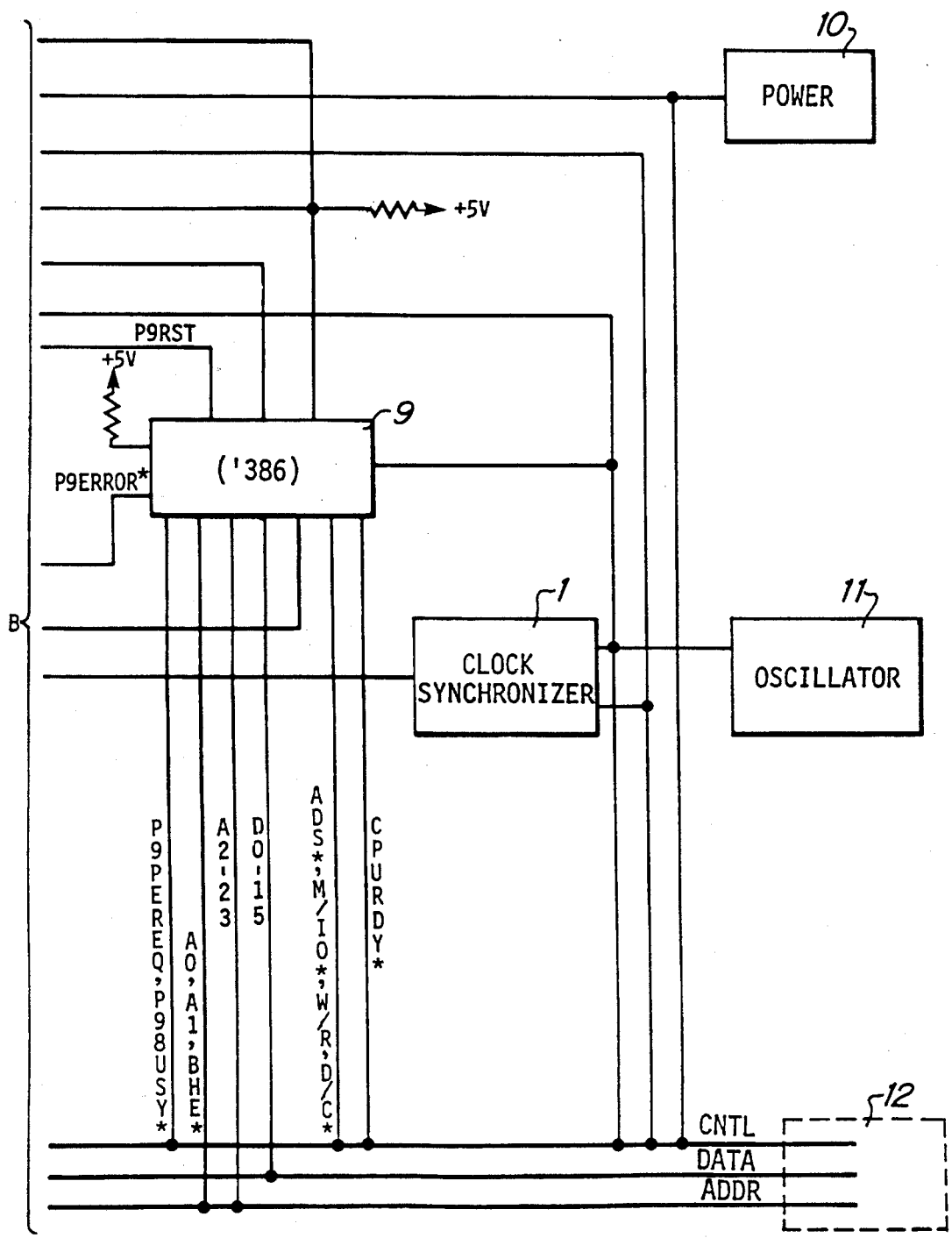

The above is a description of the system bus 12 of a 16-bit system. Actually, this invention is not limited to the 16-bit systems. When the system bus 12 is 32 bits, as shown in FIG. 8, most of the features described herein are still applicable. The major difference between the system in FIG. 1 and the system in FIG. 8 is that '386 sends the low portion address (SBE0#–SBE3#) directly to the system bus 12, whereas the low portion address BE0#–BE3# from the '486 are changed by the decoder 5 to SBE0#–SBE3# before it is sent to the system bus 12. Moreover, because the data signals are 32 bits, BS16# of the '486 need not be pulled to ground and there is no need to handle the so called low portion bit data or high portion bit data.

The above is a description of the preferred embodiment of a system capable of operating with different types of CPU. A person skilled in the art, of course, knows that certain modifications can be made without diverging from the spirit and scope of the invention. Therefore the scope of protection of this invention is defined by the following claims.

I claim:

1. A replaceable central processing unit (CPU) chip data processing system for operating with different types of CPU chips, said system having a motherboard, a system clock, and at least one external device, each CPU chip operating from a CPU clock, said data processing system comprising:

(a) a first CPU chip socket, disposed on the motherboard, for direct insertion of a first CPU chip;

(b) a second CPU chip socket, disposed on the motherboard, for direct insertion of a second CPU chip;

(c) an interface control circuit, coupled to said first and second CPU chip sockets, to the system clock, and to the external devices, for controlling interfacing between the CPU chips and the external devices, said interface control circuit responsive to the system clock;

(d) clock generating means, coupled to said first and second CPU chip sockets, for generating a first CPU clock signal for said first CPU chip socket and a second CPU clock signal for said second CPU chip socket;

(e) detector means coupled to said second CPU chip socket for detecting the presence of the second CPU chip in said second CPU chip socket;

(f) means, coupled to said detector means and to said first and second CPU chip sockets, for activating the first CPU chip on detecting the presence of only the first CPU chip in said first CPU chip socket and activating the second CPU chip on detecting the presence of the second CPU chip in said second CPU chip socket and deactivating the first CPU chip in said first CPU chip socket;

(g) means, coupled to the system clock and to said second CPU chip socket, for synchronizing the CPU clock of the second CPU chip with the system clock; and (h) means, coupled to said first and second CPU chip sockets, for adapting address signals from the second CPU chip for enabling the second CPU chip to address data in said data processing system.

2. A data processing system as in claim 1, wherein the activated CPU chip includes a coprocessor and said data processing system further comprises means, coupled to said first and second CPU chip sockets, for processing errors of the coprocessor of the activated CPU chips.

3. A data processing system as in claim 1, wherein the first CPU chip is deactivated by being put into a HOLD state.

4. A data processing system as in claim 1, further comprising means, coupled to said first and second CPU sockets, for inhibiting a subset of outputs of a deactivated first CPU chip.

5. A replaceable central processing unit (CPu) chip data processing system, having a motherboard, for operating with different generations of CPU chips, comprising:

(a) a CPU chip socket, disposed on the motherboard, for direct insertion of a first CPU chip;

(b) an upgrade CPU chip socket, disposed on the motherboard, for direct insertion of a second CPU chip;

(c) means, coupled to said first CPU chip socket, for generating a system clock signal for operating said data processing system; and (d) means, coupled to said system clock generating means, for generating a reset signal for resetting the second CPU chip; and (e) means, coupled to said system clock generating means, to said upgrade CPU chip socket, and to said reset signal generating means, for generating a CPU clock signal for said second CPU chip and for providing synchronization between said system clock signal and said CPU clock signal, the synchronization means using said reset signal to synchronize said system clock signal and said CPU clock signal.

6. A system as in claim 5, wherein said synchronization means comprises means for delaying said reset signal to produce a delayed reset signal and means for providing secondary synchronization between said CPU clock signal and said system clock signal during a time period between activation of said reset signal and said delayed reset signal.

7. A system as in claim 6, wherein said synchronization means comprises a delay circuit and an inverter circuit.

8. A system as in claim 5, wherein said system clock signal has a first frequency and said CPU clock signal has a second frequency which is a multiple of said first frequency.

9. A system as in claim 5, further comprising means, coupled to said reset generating means, for detecting stabilization of power in said data processing system and wherein said means for generating said reset signal operates in response to a stabilization of power in said data processing system.

10. A replaceable central processing unit (CPU) chip data processing system comprising a first CPU chip socket disposed on a motherboard for direct insertion of a first CPU chip and a second CPU chip socket disposed on said motherboard for direct insertion of a second CPU chip, each CPU chip having an operating frequency, and means for enabling the system to operate with the second CPU chip operating at a different frequency than the operating frequency of the first CPU chip, the system further comprising:

(a) means for generating a system reset signal;

(b) means for generating a system clock signal for clocking said data processing system;

(c) means for generating a CPU clock signal for clocking the first and second CPU chips; and (d) means, coupled to said first and second CPU chip sockets, to said reset signal generating means, to said system clock signal generating means, and to said CPU clock signal generating means, for providing synchronization between said system clock signal and said CPU clock signal in response to said reset signal.

11. A replaceable central processing unit (CPu) chip.data processing system for operating with different types of CPU chips, the system comprising a first CPU chip socket disposed on a motherboard for direct insertion of a CPU chip and a second CPU chip socket disposed on said motherboard for direct insertion of an upgraded CPU chip, means for enabling the system to operate with CPU chips operating at different frequencies, and (a) means for generating an indication signal indicating stabilization of power supplied to said system;

(b) means for generating a first clock signal;

(c) an interface controller, coupled to said power stabilization indication signal generating means and to said first clock signal generating means and responsive to said first clock signal for generating a second clock signal and responsive to said stabilization indication signal to generate a reset signal; and (d) a synchronizer, coupled to said interface controller and to said first and second CPU chip sockets, and responsive to said second clock signal and said reset signal for generating a third clock signal for said second CPU chip in synchronization with said second clock signal.

12. A replaceable central processing unit (CPU) chip data processing system comprising a first CPU chip socket disposed on a motherboard for direct insertion of a first CPU chip and a second CPU chip socket disposed on said motherboard for direct insertion of a second CPU chip, means for enabling the CPU chips to operate with different frequencies, and
  (a) means for generating an indication signal indicating stabilization of power in said system;
  (b) means for generating a first clock signal;
  (c) interface control means, coupled to said indication signal generating means and to said first clock signal generator, and responsive to said first clock signal for generating a second clock signal and responsive to said stabilization indication signal for generating a reset signal; and
  (d) a synchronizer, coupled to said interface control means and to said first and second CPU chip sockets and responsive to said second clock signal and said reset signal for generating a third clock signal for said first CPU chip socket and for generating a fourth clock signal for said second CPU chip socket in synchronization with said third clock signal.

13. A replaceable central processing unit (CPU) chip data processing system, having a motherboard, for operating with different types of CPU chips, the system comprising:
  (a) a first CPU chip socket, disposed on the motherboard, for direct insertion of a CPU chip,
  (b) a second CPU chip socket, disposed on the motherboard, for direct insertion of a second CPU chip,
  (c) detection means, coupled to said second CPU chip socket, for detecting the presence of said second CPU chip in said second CPU chip socket, and
  (d) sequencer means, coupled to said first and second CPU chip sockets, comprising:
    i. means for generating a reset signal for said first CPU chip socket and a reset signal for said second CPU chip socket,
    ii. means responsive to the presence of a CPU chip in said second CPU chip socket for generating a signal to said first CPU chid socket for putting said first CPU chip in said first CPU chip socket into a HOLD state, and
    iii. means responsive to said first CPU chip in said first CPU chip socket being placed in said HOLD state for enabling said second CPU chip to enter into operation.

14. A replaceable central processing unit (CPU) chip data processing system, having a motherboard, for operating with different types of CPU chips, the system comprising:
  (a) a first CPU chip socket, disposed on the motherboard, for direct insertion of a first CPU chip,
  (b) a second CPU chip socket, disposed on the motherboard, for direct insertion of a second CPU chip,
  (c) means, coupled to said first and second CPU chip sockets, for providing selection between one of said first CPU chip in said first CPU chip socket and said second CPU chip in said second CPU chip socket,
  (d) sequencer means comprising:
    (i) means, coupled to said first and second CPU chip sockets, for generating a reset signal for said first CPU chip and a reset signal for said second CPU chip,
    (ii) means responsive to said selection means for disabling said non-selected CPU chip,
    (iii) means responsive to said selection means for enabling said selected CPU chip to enter into operation.

15. In a replaceable central processing unit (CPU) chip data processing system having a first CPU chip socket disposed on a motherboard for direct insertion of a first CPU chip and a second CPU chip socket disposed on a motherboard for direct insertion of a second CPU chip, a method for operation of the system having said first and said second CPU chips inserted, comprising the steps of:
  (a) detecting the presence of said second CPU chip in said second CPU chip socket,
  (b) generating a reset signal for said first CPU chip socket and a reset signal for said second CPU chip socket,
  (c) generating a signal for said first CPU chip socket, in response to the presence of said second CPU chip, to put said first CPU chip in said first CPU chip socket into a HOLD state, and
  (d) enabling said second CPU chip to enter into operation in response to said first CPU chip in said first CPU chip socket being in a HOLD state.

16. A method as in claim 15, further comprising a first step of putting said second CPU chip in said second CPU chip socket into a HOLD state before putting said first CPU chip in said first CPU chip socket into a HOLD state, thereby allowing said second CPU chip in said second CPU chip socket to be released and to operate upon said first CPU chip being in said HOLD state.

17. A replaceable central processing unit (CPU) chip data processing system, having a motherboard, for operating with different types of CPU chips, said system comprising:
  (a) a first CPU chip socket, disposed on the motherboard, for direct insertion of a first CPU chid of a first type, said first type of CPU chip having an internal coprocessor;
  (b) a second CPU chip socket, disposed on the motherboard, for direct insertion of a second CPU chid of a second type, said second type of CPU chip having an external coprocessor;
  (c) a coprocessor socket for insertion of an external coprocessor of said second type of CPU chip;
  (d) a controller, coupled to said first and second CPU chip sockets and at least one external device, for controlling interfacing between one of said CPU chips and external devices operating with said system; and
  (e) coprocessor interface means, coupled to said second CPU chip socket, to said controller, and to said coprocessor socket, for interfacing said controller with said second CPU chip socket and said coprocessor socket.

18. A data processing system as in claim 17, wherein said coprocessor interface comprises means for sending an indication signal to said controller when at least one of said first CPU socket and said coprocessor socket is populated.

19. A data processing system as in claim 17, wherein said coprocessor interface comprises means for selectively sending a status signal from one of said first CPU socket and said coprocessor in said coprocessor socket to said controller.

20. A data processing system as in claim 19, wherein said status signal is an error signal.

21. A replaceable central processing unit (CPU) chip data processing system, having a motherboard, for operating with different types of CPU chips wherein the different types of CPU chips address data differently, the data processing system comprising:
  (a) a memory;
  (b) a first CPU chip socket, disposed on the motherboard, for direct insertion of a first CPU chip;
  (c) a second CPU chip socket, disposed on the motherboard, for direct insertion of a second CPU chip;

(d) a system bus, coupled to said memory and to said first and second CPU chip sockets, for communicating data and addresses between said memory and said first CPU chip and for communicating data and addresses between said memory and said second CPU chip; and (e) means, coupled to said first and second CPU chip sockets, for detecting the presence of said first CPU chip and said second CPU chip; and (f) means, coupled to said second CPU chip socket and to said system bus, for communicating address signals from said second CPU chip socket to said system bus, for inhibiting address signals from said second CPU chip socket to said system bus, for inhibiting said address signals from said second CPU chip in said second CPU chip socket when said second CPU chip in said second chid socket is inactive, for inhibiting said address signals from said second CPU chip socket when said first CPU chid in said first CPU chip socket is active, and for inhibiting said address signals from said second CPU chip socket when said second CPU chip socket is not populated.

22. A replaceable central processing unit (CPU) chip data processing system, having a motherboard, for operating with different types of CPU chips, said system comprising:

(a) a first CPU chip socket, disposed on the motherboardr for direct insertion of a CPU chip having an internal coprocessor;

(b) a second CPU chip socket, disposed on the motherboard, for direct insertion of an upgraded CPU chip having an internal coprocessor;

(c) a controller, coupled to said first and second CPU chip sockets and at least one external device, for controlling interfacing between one of said CPU chips and external devices operating with said system; and (e) coprocessor interface means, coupled to said first and second CPU chip sockets, and to said controller, for interfacing said controller with said first CPU chip socket and said second CPU chip socket.

23. A replaceable central processing unit (CPU) chip data processing system, having a motherboard, for operating with different types of CPU chips, the system comprising:

(a) a first CPU chip socket, digposed on the motherboard, for direct insertion of a first CPU chip, (b) a second CPU chip socket, disposed on the motherboard, for direct insertion of a second CPU chip, (c) means, coupled to said first and second CPU chip sockets, for providing selection between said first CPU chip in said first CPU chip socket and said second CPU chip in said second CPU chip socket by selecting said first CPU chip if only said first CPU chip is present and selecting said second CPU chip if said second CPU chip is present, and (d) sequencer means comprising:
  (i) means responsive to said selection means for disabling said first CPU chip, and
  (ii) means responsive to said selection means for enabling said selected CPU chip to enter into operation.

24. A replaceable central processing unit (CPU) chip data processing system, having a motherboard and at least one external device, for operating with different types of CPU chips wherein the different types of CPU chips address data by a high portion address for defining the location of the data being accessed and a low portion address for identifying which bytes of the data in the location are being accessed, the data processing system comprising:

(a) a memory;

(b) means for generating a system clock signal for clocking said data processing system;

(c) means, coupled to said system clock generating means, for generating a system reset signal;

(d) a first CPU chip socket, disposed on the motherboard, for direct insertion of a first CPU chip;

(e) a second CPU chip socket, disposed on the motherboard, for direct insertion of a second CPU chip;

(f) data access means, coupled to said memory and to said first and second chip sockets, for accessing data, including:
  (i) a system bus for communicating data, control signals and addresses between said memory and the first and second CPU chips, and
  (ii) converting means, coupled to said system bus, for converting the low portion address from the second CPU chip so as to enable the second CPU chip to address data using said high portion address together with said converted low portion address;

(g) an interface control circuit, coupled to said first and second chip sockets, to said system clock signal generating means, and to the external devices, for controlling interfacing between the first and second CPU chips and the external devices, said interface control circuit responsive to said system clock signal;

(h) means, coupled to said system clock generating means and to said second CPU chip socket for generating a CPU clock signal for said second CPU chip and for providing synchronization between said system clock signal and said CPU clock signal;

(i) means, coupled to said first and second CPU chip sockets, for providing selection between said first CPU chip if only the first CPU chip is present in said first CPU chip socket and selecting the second CPU chip if said second CPU chip is present in said second CPU chip socket; and (j) sequencer means comprising:
  (i) means responsive to said selection means for disabling said first CPU chip, and
  (ii) means responsive to said selection means for enabling said selected CPU chip to enter into operation.

25. A replaceable central processing unit (CPU) chip motherboard system for operating with different types of CPU chips, and at least one external device, said system having a system clock, each CPU chip operating from a CPU clock, said motherboard system comprising:

(a) a first CPU chip socket disposed on said motherboard for direct insertion of a first CPU chip;

(b) a second CPU chip socket disposed on said motherboard for direct insertion of a second CPU chip;

(c) an interface control circuit, coupled to said first and second CPU chip sockets, to the system clock, and to the external devices, for controlling interfacing between the CPU chips and the external devices, said interface control circuit operating from the system clock;

(d) clock generating means, coupled to said first and second CPU chip sockets, for generating a first CPU clock signal for said first CPU chip socket and a second CPU clock signal for said second CPU chip socket;

(e) detector means coupled to said second CPU chip socket for detecting the presence of an inserted CPU chip in said second CPU chip socket;

(f) means, coupled to said detector means and to said first and second CPU chip sockets, for activating the first CPU chip on detecting the presence of only the first CPU chip in said first CPU chip socket and activating the second CPU chip on detecting the presence of the second CPU chip in said second CPU chip socket and deactivating the first CPU chip in said first CPU chip socket;

(g) means, coupled to the system clock and to said first and second CPU chip sockets, for synchronizing the CPU clock of the activated CPU chip with the system clock; and (h) means, coupled to said first and second CPU chip sockets, for adapting address signals from the activated CPU chip for enabling the activated CPU chip to address data in said data processing system.

26. A replaceable central processing unit (CPU) chip motherboard system, for operating with different types of CPU chips, the system comprising:

(a) a first CPU chip socket, disposed on the motherboard, for direct insertion of a first CPU chip;

(b) a second CPU chip socket, disposed on the motherboard, for direct insertion of a second CPU (c) means, coupled to said first and second CPU chip sockets, for providing selection between said first CPU chip in said first CPU chip socket and said second CPU chip in said second CPU chip socket by selecting said first CPU chip if only said first CPU chip is present and selecting said second CPU chip if said second cPU chip is present; and (d) sequencer means comprising:
(i) means responsive to said selection means for disabling said first CPU chip, and
(ii) means responsive to said selection means for enabling said selected CPU chip to enter into operation.

* * * * *